(12) United States Patent
Lavi et al.

(10) Patent No.: US 11,615,161 B2
(45) Date of Patent: Mar. 28, 2023

(54) SYSTEM AND METHOD FOR DYNAMICALLY ENABLING CUSTOMIZED WEB CONTENT AND APPLICATIONS

(71) Applicant: LivePerson, Inc., New York, NY (US)

(72) Inventors: Asaf Lavi, Sde Varburg (IL); Efim Dimenstein, Bnei Atarot (IL); Eli Campo, Savion (IL)

(73) Assignee: LIVEPERSON, INC., New York, NY (US)

(*) Notice: Subject to any disclaimer, the term of this patent is extended or adjusted under 35 U.S.C. 154(b) by 0 days.

(21) Appl. No.: 15/682,186

(22) Filed: Aug. 21, 2017

(65) Prior Publication Data

US 2018/0181675 A1 Jun. 28, 2018

Related U.S. Application Data

(63) Continuation of application No. 13/080,324, filed on Apr. 5, 2011, now Pat. No. 9,767,212.

(Continued)

(51) Int. Cl.
*G06F 3/0481* (2022.01)
*G06F 16/957* (2019.01)

(52) U.S. Cl.
CPC .............. *G06F 16/9577* (2019.01)

(58) Field of Classification Search
CPC .............. G06F 21/6263; G06F 3/0481; G06F 17/30867
See application file for complete search history.

(56) References Cited

U.S. PATENT DOCUMENTS

| 5,450,537 A | 9/1995 | Hirai et al. |
| 5,517,405 A | 5/1996 | McAndrew et al. |

(Continued)

FOREIGN PATENT DOCUMENTS

| EP | 840244 A1 | 5/1998 |
| EP | 1233361 A1 | 8/2002 |

(Continued)

OTHER PUBLICATIONS

Chartrand Sabra, "A new system seeks to ease the bottleneck in the customer-service information highway," The New York Times (Apr. 30, 2001), 2 pages.

(Continued)

*Primary Examiner* — Stephen S Hong
*Assistant Examiner* — Ahamed I Nazar
(74) *Attorney, Agent, or Firm* — Polsinelli LLP

(57) ABSTRACT

Described are computer-based methods and apparatuses, including computer program products, for dynamically enabling customized web content and applications. One or more rules are stored in a database. Default tag code is transmitted to a browser in response to a request from the browser, the default tag code including data that causes the browser to generate a tag module. An update is received from the tag module comprising data indicative of a visitor's interaction with web page content displayed through the browser. A condition associated with a rule from the one or more rules is determined to be satisfied based on the update. An action associated with the rule is performed, comprising transmitting custom targeted tag code to the tag module, wherein the custom targeted tag code includes data that causes the browser, upon execution of the custom targeted tag code by the tag module, to perform an action.

21 Claims, 8 Drawing Sheets

Related U.S. Application Data

(60) Provisional application No. 61/321,603, filed on Apr. 7, 2010.

(56) References Cited

U.S. PATENT DOCUMENTS

| | | | |
|---|---|---|---|
| 5,563,805 | A | 10/1996 | Arbuckle et al. |
| 5,572,643 | A | 11/1996 | Judson |
| 5,581,702 | A | 12/1996 | McArdle et al. |
| 5,583,763 | A | 12/1996 | Atcheson et al. |
| 5,590,038 | A | 12/1996 | Pitroda |
| 5,592,378 | A | 1/1997 | Cameron et al. |
| 5,596,493 | A | 1/1997 | Tone |
| 5,611,052 | A | 3/1997 | Dykstra et al. |
| 5,636,346 | A | 6/1997 | Saxe |
| 5,664,115 | A | 9/1997 | Fraser |
| 5,668,953 | A | 9/1997 | Sloo |
| 5,678,002 | A | 10/1997 | Fawcett et al. |
| 5,694,163 | A | 12/1997 | Harrison |
| 5,696,907 | A | 12/1997 | Tom |
| 5,699,526 | A | 12/1997 | Siefert |
| 5,704,029 | A | 12/1997 | Wright |
| 5,710,887 | A | 1/1998 | Chelliah et al. |
| 5,715,402 | A | 2/1998 | Popolo |
| 5,724,155 | A | 3/1998 | Saito |
| 5,724,522 | A | 3/1998 | Kagami et al. |
| 5,727,048 | A | 3/1998 | Hiroshima et al. |
| 5,727,163 | A | 3/1998 | Bezos |
| 5,732,400 | A | 3/1998 | Mandler et al. |
| 5,745,654 | A | 4/1998 | Titan |
| 5,748,755 | A | 5/1998 | Johnson et al. |
| 5,758,328 | A | 5/1998 | Giovannoli |
| 5,760,771 | A | 6/1998 | Blonder et al. |
| 5,761,640 | A | 6/1998 | Kalyanswamy et al. |
| 5,761,649 | A | 6/1998 | Hill |
| 5,764,916 | A | 6/1998 | Busey et al. |
| 5,765,142 | A | 6/1998 | Allred et al. |
| 5,774,869 | A | 6/1998 | Toader |
| 5,774,870 | A | 6/1998 | Storey |
| 5,774,882 | A | 6/1998 | Keen et al. |
| 5,774,883 | A | 6/1998 | Andersen et al. |
| 5,778,164 | A | 7/1998 | Watkins et al. |
| 5,784,568 | A | 7/1998 | Needham |
| 5,793,365 | A | 8/1998 | Tang et al. |
| 5,794,207 | A | 8/1998 | Walker et al. |
| 5,796,393 | A | 8/1998 | MacNaughton et al. |
| 5,796,952 | A | 8/1998 | Davis |
| 5,797,133 | A | 8/1998 | Jones et al. |
| 5,799,151 | A | 8/1998 | Hoffer |
| 5,805,159 | A | 9/1998 | Bertram et al. |
| 5,806,043 | A | 9/1998 | Toader |
| 5,812,769 | A | 9/1998 | Graber et al. |
| 5,815,663 | A | 9/1998 | Uomini |
| 5,818,907 | A | 10/1998 | Mahoney et al. |
| 5,819,029 | A | 10/1998 | Edwards et al. |
| 5,819,235 | A | 10/1998 | Tamai et al. |
| 5,819,236 | A | 10/1998 | Josephson |
| 5,819,291 | A | 10/1998 | Haimowitz et al. |
| 5,825,869 | A | 10/1998 | Brooks et al. |
| 5,826,241 | A | 10/1998 | Stein et al. |
| 5,826,244 | A | 10/1998 | Huberman |
| 5,828,839 | A | 10/1998 | Moncreiff |
| 5,832,465 | A | 11/1998 | Tom |
| 5,835,087 | A | 11/1998 | Herz et al. |
| 5,838,682 | A | 11/1998 | Dekelbaum et al. |
| 5,838,910 | A | 11/1998 | Domenikos et al. |
| 5,839,117 | A | 11/1998 | Cameron et al. |
| 5,850,517 | A | 12/1998 | Verkler et al. |
| 5,852,809 | A | 12/1998 | Abel et al. |
| 5,857,079 | A | 1/1999 | Claus et al. |
| 5,859,974 | A | 1/1999 | McArdle et al. |
| 5,862,330 | A | 1/1999 | Anupam et al. |
| 5,866,889 | A | 2/1999 | Weiss et al. |
| 5,870,721 | A | 2/1999 | Norris |
| 5,878,403 | A | 3/1999 | DeFrancesco et al. |
| 5,895,454 | A | 4/1999 | Harrington |
| 5,903,641 | A | 5/1999 | Tonisson |
| 5,907,677 | A | 5/1999 | Glenn et al. |
| 5,911,135 | A | 6/1999 | Atkins |
| 5,916,302 | A | 6/1999 | Dunn et al. |
| 5,918,014 | A | 6/1999 | Robinson |
| 5,924,082 | A | 7/1999 | Silverman et al. |
| 5,930,776 | A | 7/1999 | Dykstra et al. |
| 5,940,811 | A | 8/1999 | Norris |
| 5,940,812 | A | 8/1999 | Tengel et al. |
| 5,943,416 | A | 8/1999 | Gisby et al. |
| 5,943,478 | A | 8/1999 | Aggarwal et al. |
| 5,945,989 | A | 8/1999 | Freishtat et al. |
| 5,948,061 | A | 9/1999 | Merriman et al. |
| 5,950,179 | A | 9/1999 | Buchanan et al. |
| 5,956,693 | A | 9/1999 | Geerlings |
| 5,958,014 | A | 9/1999 | Cave |
| 5,960,411 | A | 9/1999 | Hartman et al. |
| 5,963,625 | A | 10/1999 | Kawecki et al. |
| 5,963,635 | A | 10/1999 | Szlam |
| 5,966,699 | A | 10/1999 | Zandi |
| 5,970,475 | A | 10/1999 | Barnes et al. |
| 5,970,478 | A | 10/1999 | Walker et al. |
| 5,974,396 | A | 10/1999 | Anderson |
| 5,974,446 | A | 10/1999 | Sonnenrich et al. |
| 5,987,434 | A | 11/1999 | Libman |
| 5,991,740 | A | 11/1999 | Messer |
| 5,995,947 | A | 11/1999 | Fraser et al. |
| 6,000,832 | A | 12/1999 | Franklin et al. |
| 6,003,013 | A | 12/1999 | Boushy |
| 6,009,410 | A | 12/1999 | LeMole et al. |
| 6,014,644 | A | 1/2000 | Erickson |
| 6,014,645 | A | 1/2000 | Cunningham |
| 6,014,647 | A | 1/2000 | Nizzari |
| 6,016,504 | A | 1/2000 | Arnold et al. |
| 6,026,370 | A | 2/2000 | Jermyn |
| 6,028,601 | A | 2/2000 | Machiraju et al. |
| 6,029,141 | A * | 2/2000 | Bezos ............... G06Q 30/0214 705/7.29 |
| 6,029,149 | A | 2/2000 | Dykstra et al. |
| 6,029,890 | A | 2/2000 | Austin et al. |
| 6,044,146 | A | 3/2000 | Gisby et al. |
| 6,044,360 | A | 3/2000 | Picciallo |
| 6,049,784 | A | 4/2000 | Weatherly et al. |
| 6,052,447 | A | 4/2000 | Golden |
| 6,052,730 | A | 4/2000 | Felciano |
| 6,055,573 | A | 4/2000 | Gardenswartz et al. |
| 6,058,375 | A | 5/2000 | Park et al. |
| 6,058,428 | A | 5/2000 | Wang et al. |
| 6,061,658 | A | 5/2000 | Chou et al. |
| 6,064,987 | A | 5/2000 | Walker et al. |
| 6,067,525 | A | 5/2000 | Jonhson et al. |
| 6,070,149 | A | 5/2000 | Tavor et al. |
| 6,073,112 | A | 6/2000 | Geerlings |
| 6,076,100 | A | 6/2000 | Cottrille et al. |
| 6,078,892 | A | 6/2000 | Anderson et al. |
| 6,084,585 | A | 7/2000 | Kraft et al. |
| 6,085,126 | A | 7/2000 | Mellgren, III et al. |
| 6,085,195 | A | 7/2000 | Hoyt et al. |
| 6,088,686 | A | 7/2000 | Walker et al. |
| 6,105,007 | A | 8/2000 | Norris |
| 6,112,190 | A | 8/2000 | Fletcher et al. |
| 6,119,101 | A | 9/2000 | Peckover |
| 6,119,103 | A | 9/2000 | Basch et al. |
| 6,131,087 | A | 10/2000 | Luke et al. |
| 6,131,095 | A | 10/2000 | Low et al. |
| 6,134,318 | A | 10/2000 | O'Neil |
| 6,134,530 | A | 10/2000 | Bunting et al. |
| 6,134,532 | A | 10/2000 | Lazarus et al. |
| 6,134,533 | A | 10/2000 | Shell |
| 6,134,548 | A | 10/2000 | Gottsman et al. |
| 6,138,139 | A | 10/2000 | Beck et al. |
| 6,141,653 | A | 10/2000 | Conklin et al. |
| 6,144,991 | A | 11/2000 | England |
| 6,163,607 | A | 12/2000 | Bogart et al. |
| 6,167,395 | A | 12/2000 | Beck et al. |
| 6,170,011 | B1 | 1/2001 | Macleod Beck et al. |
| 6,173,053 | B1 | 1/2001 | Bogart et al. |
| 6,182,050 | B1 | 1/2001 | Ballard |
| 6,182,124 | B1 | 1/2001 | Lau et al. |

(56) References Cited

U.S. PATENT DOCUMENTS

| | | |
|---|---|---|
| 6,185,543 B1 | 2/2001 | Galperin et al. |
| 6,189,003 B1 | 2/2001 | Leal |
| 6,192,319 B1 | 2/2001 | Simonson |
| 6,192,380 B1 | 2/2001 | Light et al. |
| 6,199,079 B1 | 3/2001 | Gupta et al. |
| 6,202,053 B1 | 3/2001 | Christiansen et al. |
| 6,202,155 B1 | 3/2001 | Tushie et al. |
| 6,208,979 B1 | 3/2001 | Sinclair |
| 6,222,919 B1 | 4/2001 | Hollatz et al. |
| 6,236,975 B1 | 5/2001 | Boe et al. |
| 6,240,396 B1 | 5/2001 | Walker et al. |
| 6,249,795 B1 | 6/2001 | Douglis |
| 6,262,730 B1 | 7/2001 | Horvitz |
| 6,267,292 B1 | 7/2001 | Walker et al. |
| 6,272,506 B1 | 8/2001 | Bell |
| 6,282,284 B1 | 8/2001 | Dezonno et al. |
| 6,285,983 B1 | 9/2001 | Jenkins |
| 6,289,319 B1 | 9/2001 | Lockwood |
| 6,292,786 B1 | 9/2001 | Deaton |
| 6,295,061 B1 | 9/2001 | Park et al. |
| 6,298,348 B1 | 10/2001 | Eldering |
| 6,311,169 B2 | 10/2001 | Duhon |
| 6,311,178 B1 | 10/2001 | Bi et al. |
| 6,324,524 B1 | 11/2001 | Lent et al. |
| 6,327,574 B1 | 12/2001 | Kramer et al. |
| 6,330,546 B1 | 12/2001 | Gopinathan et al. |
| 6,334,110 B1 | 12/2001 | Walter |
| 6,338,066 B1 | 1/2002 | Martin |
| 6,346,952 B1 | 2/2002 | Shtivelman |
| 6,349,290 B1 | 2/2002 | Horowitz et al. |
| 6,356,909 B1 | 3/2002 | Spencer |
| 6,374,230 B1 | 4/2002 | Walker et al. |
| 6,377,936 B1 | 4/2002 | Henrick et al. |
| 6,381,640 B1 | 4/2002 | Beck |
| 6,385,594 B1 | 5/2002 | Lebda et al. |
| 6,393,479 B1 | 5/2002 | Glommen et al. |
| 6,405,181 B2 | 6/2002 | Lent et al. |
| 6,438,526 B1 | 8/2002 | Dykes et al. |
| 6,449,358 B1 | 9/2002 | Anisimov |
| 6,449,646 B1 | 9/2002 | Sikora et al. |
| 6,463,149 B1 | 10/2002 | Jolissaint et al. |
| 6,466,970 B1 | 10/2002 | Lee |
| 6,477,533 B2 | 11/2002 | Schiff et al. |
| 6,507,851 B1 | 1/2003 | Fujiwara et al. |
| 6,510,418 B1 | 1/2003 | Case et al. |
| 6,510,427 B1 | 1/2003 | Bossemeyer, Jr. et al. |
| 6,516,421 B1 | 2/2003 | Peters |
| 6,519,628 B1 | 2/2003 | Locascio |
| 6,526,404 B1 | 2/2003 | Slater |
| 6,535,492 B2 | 3/2003 | Shtivelman |
| 6,542,936 B1 | 4/2003 | Mayle e al. |
| 6,546,372 B2 | 4/2003 | Lauffer |
| 6,549,919 B2 | 4/2003 | Lambert et al. |
| 6,567,791 B2 | 5/2003 | Lent et al. |
| 6,571,236 B1 | 5/2003 | Ruppelt |
| 6,597,377 B1 | 7/2003 | MacPhai |
| 6,606,744 B1 | 8/2003 | Mikurak |
| 6,618,746 B2 | 9/2003 | Desai et al. |
| 6,622,131 B1 | 9/2003 | Brown et al. |
| 6,622,138 B1 | 9/2003 | Bellamkonda |
| 6,654,815 B1 | 11/2003 | Goss |
| 6,662,215 B1 | 12/2003 | Moskowitz et al. |
| 6,665,395 B1 | 12/2003 | Busey et al. |
| 6,671,818 B1 | 12/2003 | Mikurak |
| 6,691,151 B1 | 2/2004 | Cheyer et al. |
| 6,691,159 B1 | 2/2004 | Grewal et al. |
| 6,701,441 B1 | 3/2004 | Balasubramaniam et al. |
| 6,718,313 B1 | 4/2004 | Lent et al. |
| 6,721,713 B1 | 4/2004 | Guheen et al. |
| 6,725,210 B1 | 4/2004 | Key |
| 6,741,995 B1 | 5/2004 | Chen |
| 6,760,429 B1 | 7/2004 | Hung et al. |
| 6,766,302 B2 | 7/2004 | Bach |
| 6,771,766 B1 | 8/2004 | Shaflee et al. |
| 6,778,982 B1 | 8/2004 | Knight |
| 6,795,812 B1 | 9/2004 | Lent et al. |
| 6,804,659 B1 | 10/2004 | Graham et al. |
| 6,826,594 B1 | 11/2004 | Pettersen |
| 6,829,585 B1 | 12/2004 | Grewal et al. |
| 6,836,768 B1 | 12/2004 | Hirsh |
| 6,839,680 B1 | 1/2005 | Liu |
| 6,839,682 B1 | 1/2005 | Blume |
| 6,850,896 B1 | 2/2005 | Kelman et al. |
| 6,865,267 B2 | 3/2005 | Dezono |
| 6,892,226 B1 | 5/2005 | Tso et al. |
| 6,892,347 B1 | 5/2005 | Williams |
| 6,904,408 B1 | 6/2005 | McCarthy et al. |
| 6,920,434 B1 | 7/2005 | Cossette |
| 6,922,705 B1 | 7/2005 | Northrup |
| 6,925,441 B1 | 8/2005 | Jones |
| 6,925,442 B1 | 8/2005 | Shapira et al. |
| 6,950,983 B1 | 9/2005 | Snavely |
| 6,965,868 B1 | 11/2005 | Bednarek |
| 6,981,028 B1 | 12/2005 | Rawat et al. |
| 6,993,557 B1 | 1/2006 | Yen |
| 7,003,476 B1 | 2/2006 | Samra et al. |
| 7,039,599 B2 | 5/2006 | Merriman et al. |
| 7,051,273 B1 | 5/2006 | Holt et al. |
| 7,076,443 B1 | 7/2006 | Emens et al. |
| 7,085,682 B1 | 8/2006 | Heller et al. |
| 7,092,959 B2 | 8/2006 | Chen |
| 7,106,850 B2 | 9/2006 | Campbell et al. |
| 7,123,974 B1 | 10/2006 | Hamilton |
| 7,143,063 B2 | 11/2006 | Lent et al. |
| 7,181,492 B2 | 2/2007 | Wen et al. |
| 7,200,614 B2 | 4/2007 | Reid et al. |
| 7,242,760 B2 | 7/2007 | Shires |
| 7,243,109 B2 | 7/2007 | Omega et al. |
| 7,251,648 B2 | 7/2007 | Chaudhuri et al. |
| 7,266,510 B1 | 9/2007 | Cofino |
| 7,287,000 B2 | 10/2007 | Boyd et al. |
| 7,313,575 B2 | 12/2007 | Carr et al. |
| 7,337,127 B1 | 2/2008 | Smith et al. |
| 7,346,576 B2 | 3/2008 | Lent et al. |
| 7,346,604 B1 | 3/2008 | Bharat et al. |
| 7,346,606 B2 | 3/2008 | Bharat |
| 7,370,002 B2 | 5/2008 | Heckerman et al. |
| 7,376,603 B1 | 5/2008 | Mayr et al. |
| 7,403,973 B2 | 7/2008 | Wilsher et al. |
| 7,424,363 B2 | 9/2008 | Cheng |
| 7,523,191 B1 | 4/2009 | Thomas et al. |
| 7,526,439 B2 | 4/2009 | Freishtat et al. |
| 7,536,320 B2 | 5/2009 | McQueen et al. |
| 7,552,080 B1 | 6/2009 | Willard et al. |
| 7,552,365 B1 | 6/2009 | Marsh |
| 7,562,058 B2 | 7/2009 | Pinto |
| 7,590,550 B2 | 9/2009 | Schoenberg |
| 7,630,986 B1 | 12/2009 | Herz et al. |
| 7,650,381 B2 | 1/2010 | Peters |
| 7,657,465 B2 | 2/2010 | Freishtat et al. |
| 7,660,815 B1 | 2/2010 | Scofield |
| 7,689,924 B1 | 3/2010 | Schneider et al. |
| 7,702,635 B2 | 4/2010 | Horvitz et al. |
| 7,716,322 B2 | 5/2010 | Benedikt et al. |
| 7,730,010 B2 | 6/2010 | Kishore et al. |
| 7,734,503 B2 | 6/2010 | Agarwal et al. |
| 7,734,632 B2 | 6/2010 | Wang |
| 7,739,149 B2 | 6/2010 | Freishtat et al. |
| 7,743,044 B1 | 6/2010 | Kalogeraki |
| 7,818,340 B1 | 10/2010 | Warren |
| 7,827,128 B1 | 11/2010 | Karlsson et al. |
| 7,865,457 B2 | 1/2011 | Ravin et al. |
| 7,877,679 B2 | 1/2011 | Ozan |
| 7,895,193 B2 | 2/2011 | Cucerzan |
| 7,958,066 B2 | 6/2011 | Pinckney et al. |
| 7,966,564 B2 | 6/2011 | Catlin et al. |
| 7,975,020 B1 * | 7/2011 | Green ............... G06Q 30/0641 709/217 |
| 8,010,422 B1 | 8/2011 | Lascelles et al. |
| 8,065,666 B2 | 11/2011 | Schnabele |
| 8,166,026 B1 | 4/2012 | Sadler |
| 8,185,544 B2 | 5/2012 | Oztekin et al. |
| 8,260,846 B2 | 9/2012 | Lahav |
| 8,266,127 B2 | 9/2012 | Mattox et al. |

(56) References Cited

U.S. PATENT DOCUMENTS

| | | |
|---|---|---|
| 8,321,906 B2 | 11/2012 | Agrusa |
| 8,386,340 B1 | 2/2013 | Feinstein |
| 8,386,509 B1 | 2/2013 | Scofield |
| 8,392,580 B2 | 3/2013 | Allen et al. |
| 8,713,424 B1 * | 4/2014 | Kuhn .................. G06F 16/9574 715/234 |
| 8,738,732 B2 | 5/2014 | Karidi |
| 8,762,313 B2 | 6/2014 | Lahav et al. |
| 8,799,200 B2 | 8/2014 | Lahav |
| 8,805,844 B2 | 8/2014 | Schorzman et al. |
| 8,805,941 B2 | 8/2014 | Barak et al. |
| 8,843,481 B1 | 9/2014 | Xu |
| 8,868,448 B2 | 10/2014 | Freishtat et al. |
| 8,918,465 B2 | 12/2014 | Barak |
| 8,943,002 B2 | 1/2015 | Zelenko et al. |
| 8,943,145 B1 | 1/2015 | Peters et al. |
| 8,954,539 B2 | 2/2015 | Lahav |
| 8,965,998 B1 | 2/2015 | Dicker |
| 9,104,970 B2 | 8/2015 | Lahav et al. |
| 9,256,761 B1 | 2/2016 | Sahu |
| 9,331,969 B2 | 5/2016 | Barak et al. |
| 9,336,487 B2 | 5/2016 | Lahav |
| 9,350,598 B2 | 5/2016 | Barak et al. |
| 9,396,295 B2 | 7/2016 | Lahav et al. |
| 9,396,436 B2 | 7/2016 | Lahav |
| 9,432,468 B2 | 8/2016 | Karidi |
| 9,525,745 B2 | 12/2016 | Karidi |
| 9,558,276 B2 | 1/2017 | Barak et al. |
| 9,563,336 B2 | 2/2017 | Barak et al. |
| 9,563,707 B2 | 2/2017 | Barak et al. |
| 9,569,537 B2 | 2/2017 | Barak et al. |
| 9,576,292 B2 | 2/2017 | Freishtat et al. |
| 9,582,579 B2 | 2/2017 | Barak et al. |
| 9,590,930 B2 | 3/2017 | Karidi |
| 9,672,196 B2 | 6/2017 | Shachar et al. |
| 9,767,212 B2 | 9/2017 | Lavi et al. |
| 9,819,561 B2 | 11/2017 | Freishtat et al. |
| 9,892,417 B2 | 2/2018 | Shachar et al. |
| 9,948,582 B2 | 4/2018 | Karidi |
| 2001/0011245 A1 | 8/2001 | Duhon |
| 2001/0011246 A1 | 8/2001 | Tammaro |
| 2001/0011262 A1 | 8/2001 | Hoyt et al. |
| 2001/0011282 A1 | 8/2001 | Katsumata et al. |
| 2001/0013009 A1 | 8/2001 | Greening et al. |
| 2001/0014877 A1 | 8/2001 | Defrancesco et al. |
| 2001/0025249 A1 | 9/2001 | Tokunaga |
| 2001/0027436 A1 | 10/2001 | Tenembaum |
| 2001/0032140 A1 | 10/2001 | Hoffman |
| 2001/0032244 A1 | 10/2001 | Neustel |
| 2001/0034689 A1 | 10/2001 | Heilman |
| 2001/0044751 A1 | 11/2001 | Pugliese |
| 2001/0054041 A1 | 12/2001 | Chang |
| 2001/0054064 A1 | 12/2001 | Kannan |
| 2001/0056405 A1 | 12/2001 | Muyres |
| 2002/0002491 A1 | 1/2002 | Whitfield |
| 2002/0004735 A1 | 1/2002 | Gross |
| 2002/0010625 A1 | 1/2002 | Smith et al. |
| 2002/0016731 A1 | 2/2002 | Kupersmit |
| 2002/0023051 A1 | 2/2002 | Kunzle et al. |
| 2002/0026351 A1 | 2/2002 | Coleman |
| 2002/0029188 A1 | 3/2002 | Schmid |
| 2002/0029267 A1 | 3/2002 | Sankuratripati et al. |
| 2002/0035486 A1 | 3/2002 | Huyn et al. |
| 2002/0038230 A1 | 3/2002 | Chen |
| 2002/0045154 A1 | 4/2002 | Wood |
| 2002/0046086 A1 | 4/2002 | Pletz |
| 2002/0046096 A1 | 4/2002 | Srinivasan |
| 2002/0047859 A1 | 4/2002 | Szlam et al. |
| 2002/0055878 A1 | 5/2002 | Burton et al. |
| 2002/0059095 A1 | 5/2002 | Cook |
| 2002/0067500 A1 | 6/2002 | Yokomizo et al. |
| 2002/0073162 A1 | 6/2002 | McErlean |
| 2002/0082923 A1 | 6/2002 | Merriman et al. |
| 2002/0083095 A1 | 6/2002 | Wu et al. |
| 2002/0083167 A1 | 6/2002 | Costigan et al. |
| 2002/0085705 A1 | 7/2002 | Shires |
| 2002/0091832 A1 | 7/2002 | Low et al. |
| 2002/0107728 A1 | 8/2002 | Bailey et al. |
| 2002/0111847 A1 | 8/2002 | Smith |
| 2002/0111850 A1 | 8/2002 | Smrcka et al. |
| 2002/0123926 A1 | 9/2002 | Bushold |
| 2002/0161620 A1 | 10/2002 | Hatanaka |
| 2002/0161651 A1 | 10/2002 | Godsey |
| 2002/0161664 A1 | 10/2002 | Shaya et al. |
| 2002/0167539 A1 | 11/2002 | Brown et al. |
| 2003/0004781 A1 | 1/2003 | Mallon |
| 2003/0009768 A1 | 1/2003 | Moir |
| 2003/0011641 A1 | 1/2003 | Totman et al. |
| 2003/0014304 A1 | 1/2003 | Calvert et al. |
| 2003/0023754 A1 | 1/2003 | Eichstadt et al. |
| 2003/0028415 A1 | 2/2003 | Herschap et al. |
| 2003/0036949 A1 | 2/2003 | Kaddeche et al. |
| 2003/0041056 A1 | 2/2003 | Bossemeyer et al. |
| 2003/0055778 A1 | 3/2003 | Erlanger |
| 2003/0061091 A1 | 3/2003 | Amaratunga |
| 2003/0079176 A1 | 4/2003 | Kang et al. |
| 2003/0105826 A1 | 6/2003 | Mayraz |
| 2003/0110130 A1 | 6/2003 | Pelletier |
| 2003/0140037 A1 | 7/2003 | Deh-Lee |
| 2003/0149581 A1 | 8/2003 | Chaudhri et al. |
| 2003/0149937 A1 | 8/2003 | McElfresh et al. |
| 2003/0154196 A1 | 8/2003 | Goodwin et al. |
| 2003/0167195 A1 | 9/2003 | Fernandes et al. |
| 2003/0177096 A1 | 9/2003 | Trent et al. |
| 2003/0195848 A1 | 10/2003 | Felger |
| 2003/0217332 A1 | 11/2003 | Smith et al. |
| 2003/0221163 A1 | 11/2003 | Glover et al. |
| 2003/0233425 A1 | 12/2003 | Lyons et al. |
| 2004/0034567 A1 | 2/2004 | Gravett |
| 2004/0064412 A1 | 4/2004 | Phillips et al. |
| 2004/0073475 A1 | 4/2004 | Tupper |
| 2004/0088323 A1 | 5/2004 | Elder et al. |
| 2004/0128390 A1 | 7/2004 | Blakley et al. |
| 2004/0141016 A1 | 7/2004 | Fukatsu et al. |
| 2004/0153368 A1 | 8/2004 | Freishtat et al. |
| 2004/0163101 A1 | 8/2004 | Swix et al. |
| 2004/0167928 A1 | 8/2004 | Anderson et al. |
| 2004/0193377 A1 | 9/2004 | Brown |
| 2004/0210820 A1 | 10/2004 | Tarr et al. |
| 2004/0243539 A1 | 12/2004 | Skurtovich et al. |
| 2004/0249650 A1 | 12/2004 | Freedman |
| 2004/0260574 A1 | 12/2004 | Gross |
| 2005/0004864 A1 | 1/2005 | Lent et al. |
| 2005/0014117 A1 | 1/2005 | Stillman |
| 2005/0033641 A1 | 2/2005 | Jha et al. |
| 2005/0033728 A1 | 2/2005 | James |
| 2005/0044149 A1 | 2/2005 | Regardie et al. |
| 2005/0091254 A1 | 4/2005 | Stabb |
| 2005/0096963 A1 | 5/2005 | Myr |
| 2005/0096997 A1 | 5/2005 | Jain et al. |
| 2005/0097089 A1 | 5/2005 | Nielsen et al. |
| 2005/0102177 A1 | 5/2005 | Takayama |
| 2005/0114195 A1 | 5/2005 | Bernasconi |
| 2005/0131944 A1 | 6/2005 | Edward |
| 2005/0132205 A1 | 6/2005 | Palliyil et al. |
| 2005/0138115 A1 | 6/2005 | Llamas et al. |
| 2005/0171861 A1 | 8/2005 | Bezos et al. |
| 2005/0183003 A1 | 8/2005 | Peri |
| 2005/0198120 A1 | 9/2005 | Reshef et al. |
| 2005/0198212 A1 | 9/2005 | Zilberfayn et al. |
| 2005/0198220 A1 | 9/2005 | Wada et al. |
| 2005/0216342 A1 | 9/2005 | Ashbaugh |
| 2005/0234761 A1 | 10/2005 | Pinto |
| 2005/0256955 A1 | 11/2005 | Bodwell et al. |
| 2005/0262065 A1 | 11/2005 | Barth et al. |
| 2005/0273388 A1 | 12/2005 | Roetter |
| 2005/0288943 A1 | 12/2005 | Wei et al. |
| 2006/0015390 A1 | 1/2006 | Rijisinghani et al. |
| 2006/0021009 A1 | 1/2006 | Lunt |
| 2006/0026147 A1 | 2/2006 | Cone et al. |
| 2006/0026237 A1 | 2/2006 | Wang et al. |
| 2006/0041378 A1 | 2/2006 | Chen |
| 2006/0041476 A1 | 2/2006 | Zheng |
| 2006/0041562 A1 | 2/2006 | Paczkowski et al. |

(56) References Cited

U.S. PATENT DOCUMENTS

| | | |
|---|---|---|
| 2006/0047615 A1 | 3/2006 | Ravin et al. |
| 2006/0059124 A1 | 3/2006 | Krishna |
| 2006/0106788 A1 | 5/2006 | Forrest |
| 2006/0122850 A1 | 6/2006 | Ward et al. |
| 2006/0168509 A1 | 7/2006 | Boss et al. |
| 2006/0224750 A1 | 10/2006 | Davies |
| 2006/0253319 A1 | 11/2006 | Chayes et al. |
| 2006/0265495 A1 | 11/2006 | Butler et al. |
| 2006/0271545 A1 | 11/2006 | Youn et al. |
| 2006/0277477 A1 | 12/2006 | Christenson |
| 2006/0282327 A1 | 12/2006 | Neal et al. |
| 2006/0282328 A1 | 12/2006 | Gerace et al. |
| 2006/0284378 A1 | 12/2006 | Snow et al. |
| 2006/0284892 A1 | 12/2006 | Sheridan |
| 2006/0288087 A1 | 12/2006 | Sun |
| 2006/0293950 A1 | 12/2006 | Meek et al. |
| 2007/0027771 A1 | 2/2007 | Collins et al. |
| 2007/0027785 A1 | 2/2007 | Lent et al. |
| 2007/0053513 A1 | 3/2007 | Hoffberg |
| 2007/0061412 A1* | 3/2007 | Karidi ............... H04L 67/02 707/E17.116 |
| 2007/0061421 A1* | 3/2007 | Karidi ............... H04L 67/535 709/218 |
| 2007/0073585 A1 | 3/2007 | Apple et al. |
| 2007/0094228 A1 | 4/2007 | Nevin et al. |
| 2007/0100653 A1 | 5/2007 | Ramer et al. |
| 2007/0100688 A1 | 5/2007 | Book |
| 2007/0116238 A1 | 5/2007 | Jacobi |
| 2007/0116239 A1 | 5/2007 | Jacobi |
| 2007/0162501 A1 | 7/2007 | Agassi et al. |
| 2007/0162846 A1 | 7/2007 | Cave |
| 2007/0168874 A1 | 7/2007 | Kloeffer |
| 2007/0185751 A1 | 8/2007 | Dempers |
| 2007/0206086 A1 | 9/2007 | Baron et al. |
| 2007/0214048 A1 | 9/2007 | Chan |
| 2007/0239527 A1 | 10/2007 | Nazer et al. |
| 2007/0250585 A1 | 10/2007 | Ly et al. |
| 2007/0256003 A1 | 11/2007 | Wagoner |
| 2007/0260596 A1 | 11/2007 | Koran et al. |
| 2007/0260624 A1 | 11/2007 | Chung et al. |
| 2007/0265873 A1 | 11/2007 | Sheth et al. |
| 2008/0021816 A1 | 1/2008 | Lent et al. |
| 2008/0033794 A1 | 2/2008 | Ou et al. |
| 2008/0033941 A1 | 2/2008 | Parrish |
| 2008/0040225 A1 | 2/2008 | Roker |
| 2008/0072170 A1 | 3/2008 | Simons |
| 2008/0133650 A1 | 6/2008 | Saarimaki et al. |
| 2008/0147480 A1 | 6/2008 | Sarma et al. |
| 2008/0147486 A1 | 6/2008 | Wu et al. |
| 2008/0147741 A1 | 6/2008 | Gonen et al. |
| 2008/0183745 A1 | 7/2008 | Cancel et al. |
| 2008/0183806 A1 | 7/2008 | Cancel et al. |
| 2008/0201436 A1 | 8/2008 | Gartner |
| 2008/0215541 A1 | 9/2008 | Li et al. |
| 2008/0222656 A1 | 9/2008 | Lyman |
| 2008/0244024 A1 | 10/2008 | Aaltonen et al. |
| 2008/0262897 A1 | 10/2008 | Howarter et al. |
| 2008/0270294 A1 | 10/2008 | Lent et al. |
| 2008/0270295 A1 | 10/2008 | Lent et al. |
| 2008/0275864 A1 | 11/2008 | Kim |
| 2008/0288658 A1 | 11/2008 | Banga |
| 2008/0319778 A1 | 12/2008 | Abhyanker |
| 2009/0006174 A1 | 1/2009 | Lauffer |
| 2009/0006179 A1 | 1/2009 | Billingsley et al. |
| 2009/0006622 A1 | 1/2009 | Doerr |
| 2009/0030859 A1 | 1/2009 | Buchs et al. |
| 2009/0037355 A1 | 2/2009 | Brave |
| 2009/0055267 A1 | 2/2009 | Roker |
| 2009/0063645 A1 | 3/2009 | Casey et al. |
| 2009/0076887 A1 | 3/2009 | Spivack et al. |
| 2009/0099904 A1 | 4/2009 | Affeld et al. |
| 2009/0119173 A1 | 5/2009 | Parsons et al. |
| 2009/0132368 A1 | 5/2009 | Cotter et al. |
| 2009/0138563 A1 | 5/2009 | Zhu |
| 2009/0138606 A1 | 5/2009 | Moran et al. |
| 2009/0164171 A1 | 6/2009 | Wold et al. |
| 2009/0177771 A1 | 7/2009 | Britton et al. |
| 2009/0210405 A1 | 8/2009 | Ortega et al. |
| 2009/0222572 A1 | 9/2009 | Fujihara |
| 2009/0228914 A1 | 9/2009 | Wong |
| 2009/0240586 A1 | 9/2009 | Ramer et al. |
| 2009/0287534 A1 | 11/2009 | Guo et al. |
| 2009/0287633 A1 | 11/2009 | Nevin et al. |
| 2009/0293001 A1 | 11/2009 | Lu et al. |
| 2009/0298480 A1 | 12/2009 | Khambete |
| 2009/0307003 A1 | 12/2009 | Benjamin |
| 2009/0319296 A1 | 12/2009 | Schoenberg |
| 2009/0327863 A1 | 12/2009 | Holt et al. |
| 2010/0023475 A1 | 1/2010 | Lahav |
| 2010/0023581 A1 | 1/2010 | Lahav |
| 2010/0049602 A1 | 2/2010 | Softky |
| 2010/0063879 A1 | 3/2010 | Araradian et al. |
| 2010/0106552 A1 | 4/2010 | Barillaud |
| 2010/0125657 A1 | 5/2010 | Dowling et al. |
| 2010/0169176 A1 | 7/2010 | Turakhia |
| 2010/0169342 A1 | 7/2010 | Kenedy |
| 2010/0205024 A1 | 8/2010 | Shachar et al. |
| 2010/0211579 A1 | 8/2010 | Fujioka |
| 2010/0255812 A1 | 10/2010 | Nanjundaiah et al. |
| 2010/0262558 A1 | 10/2010 | Willcock |
| 2010/0281008 A1 | 11/2010 | Braunwarth |
| 2010/0306043 A1 | 12/2010 | Lindsay et al. |
| 2011/0041168 A1 | 2/2011 | Murray et al. |
| 2011/0055207 A1 | 3/2011 | Schorzman et al. |
| 2011/0055331 A1 | 3/2011 | Adelman et al. |
| 2011/0055338 A1 | 3/2011 | Loeb et al. |
| 2011/0078103 A1* | 3/2011 | Teng ............... G06F 9/451 706/47 |
| 2011/0112893 A1 | 5/2011 | Karlsson et al. |
| 2011/0113101 A1 | 5/2011 | Ye et al. |
| 2011/0119264 A1 | 5/2011 | Hu et al. |
| 2011/0131077 A1 | 6/2011 | Tan |
| 2011/0137733 A1 | 6/2011 | Baird et al. |
| 2011/0138298 A1 | 6/2011 | Alfred et al. |
| 2011/0161792 A1 | 6/2011 | Florence et al. |
| 2011/0208822 A1 | 8/2011 | Rathod |
| 2011/0246255 A1 | 10/2011 | Gilbert et al. |
| 2011/0246406 A1 | 10/2011 | Lahav et al. |
| 2011/0258039 A1 | 10/2011 | Patwa et al. |
| 2011/0270926 A1 | 11/2011 | Boyd |
| 2011/0271175 A1 | 11/2011 | Lavi et al. |
| 2011/0307331 A1 | 12/2011 | Richard et al. |
| 2011/0320715 A1 | 12/2011 | Ickman et al. |
| 2012/0012358 A1 | 1/2012 | Horan et al. |
| 2012/0036200 A1 | 2/2012 | Cole |
| 2012/0042389 A1 | 2/2012 | Bradley et al. |
| 2012/0059722 A1 | 3/2012 | Rao |
| 2012/0066345 A1 | 3/2012 | Rayan |
| 2012/0130918 A1 | 5/2012 | Gordon |
| 2012/0136939 A1 | 5/2012 | Stern et al. |
| 2012/0150973 A1 | 6/2012 | Barak |
| 2012/0173373 A1 | 7/2012 | Soroca |
| 2012/0195422 A1 | 8/2012 | Famous |
| 2012/0246017 A1* | 9/2012 | Kleber ............... G06Q 30/02 715/234 |
| 2012/0254301 A1 | 10/2012 | Fiero |
| 2012/0259891 A1 | 10/2012 | Edoja |
| 2012/0323346 A1 | 12/2012 | Ashby et al. |
| 2013/0013362 A1 | 1/2013 | Walker et al. |
| 2013/0013990 A1* | 1/2013 | Green ............... G06Q 30/06 715/205 |
| 2013/0036202 A1 | 2/2013 | Lahav |
| 2013/0054707 A1 | 2/2013 | Muszynski et al. |
| 2013/0117276 A1 | 5/2013 | Hedditch |
| 2013/0117804 A1 | 5/2013 | Chawla |
| 2013/0132194 A1 | 5/2013 | Rajaram |
| 2013/0165234 A1 | 6/2013 | Hall |
| 2013/0182834 A1 | 7/2013 | Lauffer |
| 2013/0204859 A1 | 8/2013 | Vijaywargi et al. |
| 2013/0212497 A1 | 8/2013 | Zelenko et al. |
| 2013/0238714 A1 | 9/2013 | Barak et al. |
| 2013/0268468 A1 | 10/2013 | Vijayaraghavan et al. |
| 2013/0275862 A1 | 10/2013 | Adra |
| 2013/0290533 A1 | 10/2013 | Barak |

(56) References Cited

U.S. PATENT DOCUMENTS

| | | |
|---|---|---|
| 2013/0311874 A1 | 11/2013 | Schachar et al. |
| 2013/0326375 A1 | 12/2013 | Barak et al. |
| 2013/0336471 A1 | 12/2013 | Agarwal et al. |
| 2013/0339445 A1 | 12/2013 | Perincherry |
| 2014/0068011 A1 | 3/2014 | Zhang et al. |
| 2014/0115466 A1 | 4/2014 | Barak et al. |
| 2014/0222888 A1 | 8/2014 | Karidi |
| 2014/0250051 A1 | 9/2014 | Lahav et al. |
| 2014/0278795 A1 | 9/2014 | Satyamoorthy |
| 2014/0310229 A1 | 10/2014 | Lahav et al. |
| 2014/0372240 A1 | 12/2014 | Freishtat et al. |
| 2015/0012602 A1 | 1/2015 | Barak et al. |
| 2015/0012848 A1 | 1/2015 | Barak et al. |
| 2015/0019525 A1 | 1/2015 | Barak et al. |
| 2015/0019527 A1 | 1/2015 | Barak et al. |
| 2015/0149571 A1 | 5/2015 | Barak et al. |
| 2015/0200822 A1 | 7/2015 | Zelenko et al. |
| 2015/0213363 A1 | 7/2015 | Lahav et al. |
| 2015/0248486 A1 | 9/2015 | Barak et al. |
| 2015/0269609 A1 | 9/2015 | Mehanian |
| 2015/0278837 A1 | 10/2015 | Lahav et al. |
| 2016/0055277 A1 | 2/2016 | Lahav et al. |
| 2016/0117736 A1 | 4/2016 | Barak et al. |
| 2016/0248706 A1 | 8/2016 | Karidi |
| 2016/0380932 A1 | 12/2016 | Matan et al. |
| 2017/0011146 A1 | 1/2017 | Lahav et al. |
| 2017/0046021 A1 | 2/2017 | Karidi |
| 2017/0054701 A1 | 2/2017 | Barak et al. |
| 2017/0169081 A1 | 6/2017 | Barak et al. |
| 2017/0171047 A1 | 6/2017 | Freishtat et al. |
| 2017/0206568 A1 | 7/2017 | Schachar et al. |

FOREIGN PATENT DOCUMENTS

| | | |
|---|---|---|
| EP | 1276 064 A2 | 1/2003 |
| EP | 1549025 A1 | 6/2005 |
| EP | 1 840 803 A1 | 10/2007 |
| EP | 1845436 A2 | 10/2007 |
| EP | 1850284 A1 | 10/2007 |
| FR | 2 950 214 A1 | 3/2011 |
| JP | 9288453 A2 | 11/1997 |
| JP | 2004-054533 | 2/2004 |
| JP | 2010/128877 | 6/2010 |
| KR | 20040110399 A | 12/2004 |
| KR | 20050010487 A | 1/2005 |
| KR | 20080046310 A | 5/2008 |
| KR | 20080097751 A | 11/2008 |
| WO | 9722073 A1 | 6/1997 |
| WO | 9845797 A2 | 10/1998 |
| WO | 9909470 A1 | 2/1999 |
| WO | 9922328 A1 | 5/1999 |
| WO | 9944152 A1 | 9/1999 |
| WO | 00/57294 A1 | 9/2000 |
| WO | 0127825 A1 | 4/2001 |
| WO | 2001/035272 A2 | 5/2001 |
| WO | 02/065367 A2 | 8/2002 |
| WO | 03/032146 A1 | 4/2003 |
| WO | 2004/057473 A1 | 7/2004 |
| WO | 2005/059777 A1 | 6/2005 |
| WO | 2007/044757 A1 | 4/2007 |
| WO | 2007/129625 A1 | 11/2007 |
| WO | 2008/057181 A2 | 5/2008 |
| WO | 2008/143382 A1 | 11/2008 |
| WO | 2009/029940 A1 | 3/2009 |
| WO | 2010/099632 A1 | 9/2010 |
| WO | 2010/119379 A1 | 10/2010 |
| WO | 2010/144207 A1 | 12/2010 |
| WO | 2011/127049 A1 | 10/2011 |
| WO | 2013/119808 A1 | 8/2013 |
| WO | 2013/158830 A1 | 10/2013 |
| WO | 2013/163426 A1 | 10/2013 |
| WO | 2015/021068 A2 | 2/2015 |

OTHER PUBLICATIONS

Just Answer (2004 Faq) Archive.org cache of www.justanswer.com circa (Dec. 2004), 8 pages.

Pack Thomas, "Human Search Engines the next Killer app," (Dec. 1, 2000) Econtent DBS vol. 23; Issue 6, 7 pages.

MATCH.COM "Match.com Launches Match.com Advisors," PR Newswire (Oct. 14, 2003), 2 pages.

SITEL, "SITEL to Provide Live Agent Support Online for Expertcity.com," PR Newswire (Feb. 28, 2000), 2 pages.

Webmaster World, "Link to my website is in a frame with banner ad at the top," www.webmasterworld.com (Nov. 11, 2003), 2 pages.

Bry et al., "Realilzing Business Processes with ECA Rules: Benefits, Challenges, Limits," Principles and Practice of Sematic Web Reasoning Lecture Notes in Computer Science, pp. 48-62, LNCS, Springer, Berlin, DE (Jan. 2006).

Fairisaac, "How SmartForms for Blaze Advisor Works," www.fairisaac.com 12 pages (Jan. 2005).

Mesbah A et al., "A Component-and Push-Based Architectural Style for Ajax Applications," The Journal of Systems & Software, 81 (12): pp. 2194-2209, Elsevier North Holland, New York, NY US (Dec. 2008).

ORACLE Fusion Middleware Administrator's Guide for Oracle SOA (Oracle Guide) Suite 11g Release 1 (11.1.1) Part No. E10226-02 www.docs.oracle.com (Oct. 2009), 548 pages.

"OAuth core 1.0 Revision A [XP002570263]," OAuth Core Workgroups, pp. 1-27 www.ouath.net/core/1.0a/ (retrieved Jan. 31, 2013), 24 pages.

Anon., "AnswerSoft Announces Concerto; First to Combine Call Center Automation with Power of Web," Business Wire, (Feb. 3, 1997) 3 pages.

Emigh, J., "AnswerSoft Unveils Concerto for Web-Based Call Centers Feb. 5, 1996," Newsbytes, (Feb. 5, 1997) 2 pages.

Grigonis, R., "Webphony-It's not Just Callback Buttons Anymore," Computer Telephony, (Dec. 1997) 4 pages.

Wagner, M., "Caring for Customers," Internet World, (Sep. 1, 1999) 3 pages.

Sweat, J., "Human Touch—A New Wave of E-Service Offerings Blends the Web, E-Mail, and Voice Bringing People back into the Picture," Information week, (Oct. 4, 1999) 2 pages.

Kirkpatrick, K., "Electronic Exchange 2000, The," Computer Shopper, (Nov. 1999) 5 pages.

Anon., "InstantService.com Teams with Island Data to provide Integrated Solution for Online Customer Response," Business Wire, (May 22, 2000) 3 pages.

Kersnar, S., "Countrywide Offers Proprietary Technology for Online Wholesale Lending," National Mortgage News, vol. 24, No. 38, (Jun. 5, 2000) 2 pages.

Douglas Armstrong, Firstar Web site helps add up future, Milwaukee Journal Sentinel, (Mar. 28, 1996) 3 pages.

redhat .com downloaded on Jul. 23, 2006.

apache.org downloaded on Jul. 23, 2006.

mysql.com downloaded on Jul. 23, 2006.

developer.com downloaded on Jul. 23, 2006.

Canter, Ronald S., "Lender Beware-Federal Regulation of Consumer Credit", Credit World, vol. 81, No. 5, pp. 16-20, (May 1993).

Staff, "On-Line System Approves Loans While Customer Waits," Communication News, vol. 31, Issue 9, (Sep. 1994) 3 pages.

"Low-Rent Loan Officer In a Kiosk", Bank Technology News vol. 8 No. 2, p (Feb. 1995) 2 pages.

Duclaux, Denise, "A Check for $5,000 in Ten Minutes", ABA Banking Journal, vol. 87, No. 8, p. 45, AUQ. (1995) 2 pages.

"World Wide Web Enhances Customer's Choice", Cards International, No. 143, p. 9, (Nov. 1995) 2 pages.

Wells Fargo Launches First Real-Time, Online Home Equity Credit Decision-Making Service, Business Wire, (Jun. 3, 1998), Dialog_File 621: New Product Announcement, 3 pages.

Handley, John, "Credit Review Lets the Numbers Do the Talking in Home Mortgage Game", Chicago Tribune (Jul. 1998) 3 pages.

Sherman, Lee, "Wells Fargo Writes a New Online Script", Interactive Week, vol. 5, No. 31, p. 29, (Aug. 1998) 2 pages.

Calvey, Mark, "Internet Gives Bankers a Snappy Comeback", San Francisco Business Times, vol. 13, No. 5, p. 3 (Sep. 1998) 2 pages.

(56) References Cited

OTHER PUBLICATIONS

McCormick, Linda, "Users of Credit Scoring Face Tough Rules on Notification", American Banker, Dialog File 625: American Banker Publications, (Mar. 21, 1982) 2 pages.
What the Credit Bureau is Saying About You: If a Mistake Sneaks Into Your Record, You May Not Know About it Until You Get Turned Down for Credit, Changing Times, vol. 37, p. 56, (Jul. 1983) 2 pages.
McShane. Peter K., "Got Financing?", Business Journal Serving Southern Tier, CNY, Mohawk Valley, Finger Lakes. North, vol. 11, Issue 19, p. 9, (Sep. 15, 1997) 3 pages.
Borowsky, Mark, "The Neural Net: Predictor of Fraud or Victim of Hype?", Bank Technology News DialoQ File 16:PROMT, p. 7 (Sep. 1993) 2 pages.
FICO http://houseloans.idis.com/fico (2009) 1 page.
Altavista: search, FICO http://www.altavista.com (2001) 3 pages.
What Do FICO Scores Mean to Me?, http://www.sancap.com. (1999) 3 pages.
What is a FICO Score?, http://www.aspeenloan.com (2009) 1 page.
"Credit", The New Encyclopedia Britannica vol. 3 p. 722. (1994) 3 pages.
"Creditnet.com—An Online Guide to Credit Cards", http://www.creditnet/com. (1999) 1 page.
"Phillips 66 Introduces Mastercard with Rebate Feature", PR Newswire, P914NY067, (Sep. 14, 1995) 1 page.
Anon, "VAR Agreement Expands Credit Bureau Access.", (CCS America, Magnum Communications Ltd expand CardPac access, Computers in Banking, v6, n10, (1) (Oct. 1989) 2 pages.
Wortmann, Harry S., "Reengineering Update—Outsourcing: An Option Full of Benefits and Responsibilities", American Banker, (Oct. 24, 1994), p. 7A vol. 159, No. 205 3 pages.
Anon. "To Boost Balances, AT&T Renews No-Fee Universal Credit Card Offer", Gale Group Newsletter, V 10, N. 13, (Mar. 30, 1992) 2 pages.
Anon. "Citgo Puts a New Spin on the Cobranded Oil Card", Credit Card News, p. 4, (Nov. 1, 1995) 2 pages.
Anon. "Microsoft Targets More than PIM Market with Outlook 2000," Computer Reseller News, N. 805 pp. 99, (Aug. 31, 1998) 2 pages.
Chesanow, Neil, "Pick the Right Credit Cards—and use them wisely", Medical Economics, v. 75, n. 16, p. 94, (Aug. 24, 1998) 4 pages.
Friedland, Marc, "Credit Scoring Digs Deeper into Data", Credit World, v. 84, n. 5 p. 19-23, (May 1996) 5 pages.
Hollander, Geoffrey, "Sibling Tool Personator 3 untangles File Formats", InfoWorld, v20, n5, p. 102 (Feb. 2, 1998) 2 pages.
Kantrow, Yvette D., "Banks Press Cardholders to Take Cash Advances", American Banker, v. 157, n. 18 pp. 1-2. (Jan. 28, 1992) 2 pages.
Lotus News Release: "Lotus Delivers Pre-Release of Lotus Notes 4.6 Client Provides Compelling New Integration with Internet Explorer", (May 20, 1997) 2 pages.
Stetenfeld, Beth, "Credit Scoring: Finding the Right Recipe", Credit Union Management, v. 17, n 11, pp. 24-26 (Nov. 1994).
Block, Valerie, "Network Assembles Card Issuers at an Internet Site", Am. Banker, V160, (1998) 1 page.
CreditNet Financial Network http://consumers.creditnet.com (1999) 1 page.
Anon., "Lending Tree: Lending Tree Provides Borrowers Fast and Easy Online Access to Multiple Loan Offers," Business Wire, Jun. 23, 1998, 2 pages.
Anon, Regulation Z Commentary Amendments, Retail Banking Digest, vol. 15, No. 2, p. 17-18, (Mar.-Apr. 1995).
Anon, San Diego Savings Association Offers Customers No-Fee Visa Product, Card News, (Feb. 29, 1988) 1 page.
Bloom, J.K., "For This New Visa, Only Web Surfers Need Apply," American Banker, vol. 1163, No. 34 12 (Feb. 20, 1998) 2 pages.
Harney, K.R., "Realty Brokers, Lenders Face Restrictions," Arizona Republic, Final Chaser edition, Sun Living section, (Feb. 10, 1991) 2 pages.

Higgins, K.T., "Mr. Plastic Joins the Marketing Team," Credit Card Management, vol. 6, No. 3, pp. 26-30, Jun. 1993.
Microsoft Press Computer Dictionary, Third Edition, Microsoft Press, Redmond, 1997, 4 pages.
Whiteside, D.E., "One Million and Counting," Collections and Credit Risk, vol. 1, No. 11 (Nov. 1996) 5 pages.
Fickenscher, L., "Providian Undercuts rivals with 7.9% Rate Offer," American banker, vol. 163, Oct. 8, 1998, 2 pages.
Fargo, J., "The Internet Specialists," Credit Card Management, vol. 11, No. 10, pp. 38-45, Jan. 1999.
Lemay, T., "Browsing for a Mortgage a Click away," Financial Post, (Jan. 15, 2000) 1 page.
Wijnen, R., "Banks Fortify Online Services," Bank Technology News, vol. 13, No. 3, Mar. 2000, 3 pages.
Anon. "IAFC Launches NextCard, The First True Internet VISA," Business Wire, New York: (Feb. 6, 1998), 3 pages.
Lazarony, Lucy, "Only Online Applicants Need Apply," Bank Advertising News, North Palm Beach, Mar. 23, 1998, vol. 21, Issue 15, 3 pages.
FIData, Inc., News & Press Releases, "Instant Credit Union Loans via the Internet," http://web.archive.org/web/19990221115203/www.fidata-inc.com/news-pr01.htm (1999) 2 pages.
FIData, Inc., Press Releases, "Instant Loan Approvals via the Internet," http://www.fidata- inc.com/news/pr_040198.htm, (Apr. 1, 1998) 2 pages.
Staff, "On-Line System Approves Loans While Customer Waits"—Abstract, Communication News, vol. 31, Issue 9, (Sep. 1994) 3 pages.
Anon. "Affordable Lending Systems Now Available for Smaller Financial Institutions," Business Wire, (May 18, 1998), 2 pages.
Nexis—All News Sources—Examiner's NPL Search Results in U.S. Appl. No. 11/932,498, included with Office Action dated Oct. 8, 2008, 14 pages.
"Sample Experian Credit Report" by Consumer Information consumerinfo.com (Jul. 9, 1998) 4 pages.
Plaintiffs Original Complaint, Nextcard, LLC v. Liveperson, Inc.; Civil Action No. 2:08-cv- 00184-TJW, In the U.S. District Court for the Eastern District of Texas, Marshall Division, filed Apr. 30, 2008 (7 pages).
Amended Complaint and Jury Demand; Liveperson, Inc. v. Nextcard, LLC, et al.; Civil Action No. 08-062 (GMS), in the U.S. District Court for the District of Delaware, filed Mar. 18, 2008 (5 pages).
Plaintiffs Second Amended Complaint; Nextcard, LLC v. American Express Company, et al; Civil Action No. 2:07-cv-354 (TJW); In the U.S. District Court for the Eastern District of Texas, Marshall Division, filed Apr. 9, 2008 (12 pages).
Defendants HSBC North America Holdings Inc.'s and HSBC USA Inc's Answer, Affirmative Defenses and Counterclaims to Plaintiffs Second Amended Complaint; Nextcard, LLC v. American Express Company, et al; Civil Action No. 2:07-cv-354 (TJW); In the U.S. District Court for the Eastern District of Texas, Marshall Division filed (Apr. 28, 2008), 13 pages.
Answer and Counterclaims of Defendant DFS Services LLC; Nextcard, LLC v. American Express Company, et al; Civil Action No. 2:07-cv-354 (TJW); In the U.S. District Court for the Eastern District of Texas, Marshall Division, filed Apr. 28, 2008 (13 pages).
Defendant The PNC Financial Services Group, Inc.'s Answer and Affirmative Defenses to Second Amended Complaint; Nextcard, LLC v. American Express Company, et al; Civil Action No. 2:07-cv-354 (TJW); In the U.S. District Court for the Eastern District of Texas, Marshall Division, filed Apr. 28, 2008, 10 pages.
Plaintiffs Second Amended Reply to Counterclaims of Defendants HSBC North America Holdings Inc. and Hsbc USA Inc.; Nextcard, LLC v. American Express Company, et al; Civil Action No. 2:07-cv-354 (TJW); In the U.S. District Court for the Eastern District of Texas, Marshall Division, filed May 14, 2008, 5 pages.
Plaintiffs Second Amended Reply to Counterclaims of Defendant DFS Services LLC; Nextcard, LLC v. American Express Company, et al; Civil Action No. 2:07-cv-354 (TJW); In the U.S. District Court for the Eastern District of Texas, Marshall Division, filed May 14, 2008 (71 pages).
Plaintiffs Second Amended Reply to Counterclaims of Defendant American Express Company; Nextcard, LLC v. American Express

(56) References Cited

OTHER PUBLICATIONS

Company, et al; Civil Action No. 2:07-cv-354 (TJW); In the U.S. District Court for the Eastern District of Texas, Marshall Division, filed (May 8, 2008), 8 pages.
Justin Hibbard, Gregory Dalton, Mary E Thyfault. (Jun. 1998). "Web-based customer care." Information Week, (684) 18-20, 3 pages.
Kim S. Nash "Call all Customers." Computerworld, 32 (1), 25-28 (Dec. 1997), 2 pages.
PRN: "First American Financial Acquires Tele-Track Inc.," PR Newswire, (May 11, 1999), Proquest #41275773, 2 pages.
Young, Deborah, "The Information Store," (Sep. 15, 2000), Wireless Review, pp. 42, 44, 46, 48, 50.
Whiting et al., "Profitable Customers," (Mar. 29, 1999), Information Week, Issue 727, pp. 44, 45, 48, 52, 56.
Bayer, Judy, "A Framework for Developing and Using Retail Promotion Response Models," Cares Integrated Solutions, retrieved from www.ceresion.com (2007) 5 pages.
Bayer, Judy, "Automated Response Modeling System for Targeted Marketing," (Mar. 1998), Ceres Integrated Solutions, 5 pages.
Sweet et al., "Instant Marketing," (Aug. 12, 1999), Information Week, pp. 18-20.
SmartKids.com "Chooses Quadstone—The Smartest Customer Data Mining Solution," (Jul. 31, 2000), Business Wire, 2 pages.
"NCR's Next Generation Software Makes True Customer Relationship Management a Reality," (Jul. 26, 1999) PR Newswire, 3 pages.
"Quadstone System 3.0 Meets New Market Demand for Fast, Easy-to-Use Predictive Analysis for CRM," (May 22, 2000) Business Wire, 3 pages.
"Net Perceptions Alters Dynamics of Marketing Industry with Introduction of Net Perceptions for Call Centers," (Oct. 12, 1998) PR Newswire, 3 pages.
"Ceres Targeted Marketing Application," Ceres Integrated Solutions: retrieved from www.ceresios.com/Product/index.htm (2007) 3 pages.
Prince, C. J., E:business: A Look at the Future, Chief Executive, vol. 154, (Apr. 2000), pp. 10-11.
Oikarinen et al. "Internet Relay Chat Protocol" RFC-1459, pp. 1-65, (May 1993).
eDiet.com: Personalized Diets, Fitness, and Counseling, (May 3, 1998), pp. 1-15.
Fiszer, Max; "Customizing an inbound call-center with skills-based routing," Telemarketing & Call Center Solutions, (Jan. 1997), v15i7 p. 24; Proquest #11267840, 5 pages.
"ESL Federal Credit Union Inaugurates Internet Target Marketing." PR Newswire p. 4210 (Oct. 6, 1998), 3 pages.
"Welcome to eStara—The Industry Leader in Click to Call and Call Tracking Solutions," e-Stara, Inc., retrieved from www.estara.com on Mar. 21, 2013, 1 page.
"Push to Talk Live Now! From your website" iTalkSystem, Inc., retrieved from www.italksystems.com on Mar. 21, 2013, 1 page.
Richardson et al., "Predicting Clicks: Estimating the Click-Through Rate for New Ads," (May 2007) 9 pages.
"Welcome to Keen" retrieved from www.archive.org/web/20010302014355/http://www.keen.com/ on Jan. 25, 2013, 1 page.
Christophe Destruel, Herve Luga, Yves Duthen, Rene Caubet. "Classifiers based system for interface evolution." Expersys Conference, 265-270 (1997), 6 pages.
Ulla de Stricker, Annie Joan Olesen. "Is Management Consulting for You?" SEARCHER, 48-53 (Mar. 2005), 6 pages.
Humberto T. Marques Neto, Leonardo C.D. Rocha, Pedro H.C. Guerra, Jussara M. Almeida, Wagner Meira Jr., Virgilio A. F. Almeida. "A Characterization of Broadband User Behavior and Their E-Business Activities." ACM SIGMETRICS Performance Evaluation Review, 3-13 (2004), 11 pages.
Greg Bowman, Michael M. Danchak, Mary LaCombe, Don Porter. "Implementing the Rensselaer 80/20 Model in Professional Education." 30th ASEE/IEEE Frontiers in Education Conference, Session T3G (Oct. 18-21, 2000), 1 page.
Elizabeth Sklar Rozier, Richard Alterman. "Participatory Adaptation." CHI, 97, 261-262 (March, 22-27, 1997), 2 pages.
Frank White. "The User Interface of Expert Systems: What Recent Research Tells Us." Library Software Review, vol. 13, No. 2, p. 91-98 (Summer 1994) 8 pages.
Frederick W. Rook, Michael L. Donnell. "Human Cognition and the Expert System Interface: Mental Models and Inference Explanations." IEEE Transactions On Systems, Man, and Cybernetics, vol. 23, No. 6, p. 1649-1661 (Nov./Dec. 1993), 13 pages.
Francois Bry et al., "Realizing Business Processes with ECA Rules: Benefits Challenges, Limits" (2006) Principles and Practive of Semantic Web Reasoning Lecture Notes in Computer Science; LNCS Springer Belin DE pp. 48-62 XP019042871, ISBN: 978-3540-39586-7.
International Search Report and Written Opinion for PCT Application No. PCT/US2013/041147, dated Jul. 30, 2013, 9 pages.
International Search Report and Written Opinion for PCT Application No. PCT/US2013/037086, dated Jul. 12, 2013, 9 pages.
International Search Report and Written Opinion for PCT Application No. PCT/US2013/29389, dated Jul. 24, 2013, 8 pages.
International Search Report and Written Opinion for PCT Application No. PCT/US2013/038212, dated Jul. 17, 2013, 11 pages.
International Search Report for PCT Application No. PCT/US03/41090, dated Sep. 1, 2004, 3 pages.
International Search Report for PCT Application No. PCT/US05/40012, dated Oct. 5, 2007, 2 pages.
International Preliminary Report on Patentability for PCT Application No. PCT/US2006/039630, dated Apr. 16, 2008, 4 pages.
International Search Report for PCT Application No. PCT/US2011/031239, dated Jul. 7, 2011, 3 pages.
International Search Report for PCT Application No. PCT/US2011/064946, dated Jun. 22, 2012, 3 pages.
International Preliminary Report on Patentability for PCT Application No. PCT/US2011/031239, dated Oct. 9, 2012, 8 pages.
International Search Report and Written Opinion for PCT Application No. PCT/US14/49822, dated Feb. 27, 2015, 11 pages.
Extended European Search Report dated Jul. 7, 2015 for European Patent Application No. 15161694.3; 8 pages.
International Preliminary Report on Patentability for PCT Application No. PCT/US2014/049822, dated Feb. 18, 2016, 7 pages.

\* cited by examiner

RULE TYPES

Name: 702
Description: 704
Rule Type: 706
Campaign/Initiative/Followup: 708
Segment: 710
Status: 712

If All ▼ of the following conditions are true:

time on the site >= '360' seconds
Add Condition time on the site >= '360' seconds — 714
While visitor is browsing site ▼ — 716
No Campaign ▼
All Visitors ▼
Enabled ▼ — 718 here we defined the condition. The rule is fired after the visitor is on the site for more than 300 seconds. This is just an example of a rule.

Then perform these actions

Add Action

Choose Type: Third Party Notifications — 720
Action: Send Tag To Browser ▼ — 722 send script ▼ tag to browser: src=//www.mysite.com/x.js charset= UTF-8
          — 750    752  726
send a script or img tag to your browser by preceding the src here we define the action. In this case, we define the location of the code (x.js)

☐ Stop processing after this rule

[Update All] [Cancel]
728

FIG. 7B

SYSTEM AND METHOD FOR DYNAMICALLY ENABLING CUSTOMIZED WEB CONTENT AND APPLICATIONS

CROSS REFERENCES TO RELATED APPLICATIONS

This application is a continuation of U.S. patent application Ser. No. 13/080,324 filed on Apr. 5, 2011 which claims the benefit of and priority under 35 U.S.C. § 119(e) to U.S. Provisional Application No. 61/321,603 filed on Apr. 7, 2010, the disclosure of each of which is incorporated herein by reference in its entirety for all purposes.

FIELD OF THE INVENTION

The present invention relates generally to computer-based methods and apparatuses, including computer program products, for dynamically enabling customized web content and applications.

BACKGROUND

Web sites are often built using code (e.g., HyperText Markup Language (HTML) and/or other code) that is stored on content servers and transmitted to a requesting visitor's browser. Web sites can have various purposes, such as advertising, sales, etc. However, regardless of a website's purpose, the visitor's experience is often limited by the actual content of the web page, which is defined by the content server code. For example, web site designers are often faced with the task of designing a web site to appeal to the broadest-possible audience. Since the web site experience is the same for each visitor, the web site is most effective at carrying out its intended purpose (e.g., sales, conveyance of information) when it appeals to a broad range of visitors.

Similarly, web site designers are faced with the challenge of constantly maintaining the code stored on the content servers. For example, the code may need to be modified to add new information (e.g., new services, features, products, etc.) and/or to remove old information. Each change often requires making changes to the code stored on the content servers. Further, it is difficult to customize a web page based on a visitor's interaction with the web page. It is desirable to maintain web pages (or web sites) to incorporate new content and/or to customize the web pages based on a visitor's interaction with the web page without modifying the underlying code of the web site (e.g., the code stored on the content servers).

SUMMARY OF THE INVENTION

The techniques described herein provide computerized methods, apparatuses, and computer program products for dynamically enabling customized web content and applications. Such dynamic enablement facilitates, for example, customizing a web site individually for each visitor of the web site based on the visitor's interactions with the web site.

In one embodiment, a computer implemented method for dynamically enabling customized web content and applications is featured. The method includes storing, by a custom content server, one or more rules in a database, each rule including a condition and an action. The method includes transmitting, by the custom content server, default tag code to a browser executing on a computing device in response to a request from the browser, the default tag code including data that causes the browser to generate a tag module in a memory of the computing device. The method includes receiving, by the custom content server, an update from the tag module including data indicative of a visitor's interaction with web page content displayed through the browser. The method includes determining, by the custom content server, a condition associated with a rule from the one or more rules is satisfied based on the update. The method includes performing, by the custom content server, an action associated with the rule, including transmitting custom targeted tag code to the tag module, wherein the custom targeted tag code includes data that causes the browser, upon execution of the custom targeted tag code by the tag module, to perform an action.

In another embodiment, an apparatus for dynamically enabling customized web content and applications is featured. The apparatus includes a processor and memory. The apparatus is configured to store one or more rules in a database, each rule including a condition and an action. The apparatus is configured to transmit default tag code to a browser executing on a computing device in response to a request from the browser, the default tag code including data that causes the browser to generate a tag module in a memory of the computing device. The apparatus is configured to receive an update from the tag module including data indicative of a visitor's interaction with web page content displayed through the browser. The apparatus is configured to determine a condition associated with a rule from the one or more rules is satisfied based on the update. The apparatus is configured to perform an action associated with the rule, including transmitting custom targeted tag code to the tag module, wherein the custom targeted tag code includes data that causes the browser, upon execution of the custom targeted tag code by the tag module, to perform an action.

In another embodiment, a computer program product, tangibly embodied in a non-transitory computer readable medium is featured. The computer program product includes instructions being configured to cause a data processing apparatus to store one or more rules in a database, each rule including a condition and an action. The computer program product includes instructions being configured to cause a data processing apparatus to transmit default tag code to a browser executing on a computing device in response to a request from the browser, the default tag code including data that causes the browser to generate a tag module in a memory of the computing device. The computer program product includes instructions being configured to cause a data processing apparatus to receive an update from the tag module including data indicative of a visitor's interaction with web page content displayed through the browser. The computer program product includes instructions being configured to cause a data processing apparatus to determine a condition associated with a rule from the one or more rules is satisfied based on the update. The computer program product includes instructions being configured to cause a data processing apparatus to perform an action associated with the rule, including transmitting custom targeted tag code to the tag module, wherein the custom targeted tag code includes data that causes the browser, upon execution of the custom targeted tag code by the tag module, to perform an action.

In another embodiment, an apparatus for dynamically enabling customized web content and applications is featured. The apparatus includes a means for storing one or more rules in a database, each rule including a condition and an action. The means transmits default tag code to a browser executing on a computing device in response to a request from the browser, the default tag code including data that causes the browser to generate a tag module in a memory of the computing device. The means receives an update from the tag module including data indicative of a visitor's interaction with web page content displayed through the browser. The means determines a condition associated with a rule from the one or more rules is satisfied based on the update. The means performs an action associated with the rule, including transmitting custom targeted tag code to the tag module, wherein the custom targeted tag code includes data that causes the browser, upon execution of the custom targeted tag code by the tag module, to perform an action.

In other examples, any of the aspects above can include one or more of the following features. Determining can include determining one or more rules associated with the tag module based on a unique identifier for the tag module included in the update, and determining whether a rule from the one or more rules includes a condition that is satisfied based on the update.

In some examples, the action includes downloading content from a remote server, and integrating the content into the web page content. The action can include changing a display of the web page content. The action can include storing data indicative of the visitor's interaction with the web page content displayed by the browser to the computing device. Code provided by a third party can be used to store the data, so the third-party can access the stored data to customize second web page content for a second web page based on the stored data.

In other examples, data indicative of a new rule is received, the data defining a condition for the rule necessary to invoke the rule and an action for the rule that is performed upon the occurrence of the condition, and the new rule is stored in the database. Data can be received that is indicative of the condition being selected from a predefined list of conditions, and the response including code, a link to code, or any combination thereof. The browser can generate the request based on a tag included in the web page content loaded by the browser. The update can be a periodic update, a visitor event-driven update, or any combination thereof.

The techniques, which include both computerized methods and apparatuses, described herein can provide one or more of the following advantages. A technical problem addressed by these computerized techniques is how to customize the behavior of a web site for each individual visitor, such that web page content can be modified (and/or additionally processed) without modifying the underlying code for the web page (e.g., the original code stored on a content server). A technical solution is to insert a tag (e.g., an HTML tag) into the underlying code for a web page that causes a browser to monitor the behavior of the visitor (e.g., mouse clicks, web page content selection, data entry, etc.). A website host can define rules that trigger certain actions based on the visitor's behavior. The visitor's behavior can be analyzed according to the rules to modify the content of the web page and/or to request additional content not in the web page (e.g., coupons, a web banner, video content). Tags can also be used to store data indicative of the visitor's interactions with a first web page, and then used to tailor to the visitor's experiences with a second web page.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIGS. 7A-7B are exemplary screenshots showing a rule configuration web page for adding rules according to one embodiment.

DETAILED DESCRIPTION

In general overview, embodiments of the invention enable a website operator to customize the behavior of the website for each individual visitor according to monitored behavior of the visitor. Preferably, website operator can incorporate new code into their website without modifying the underlying code of the website by using a tag. In a preferred embodiment the tag is an HTML tag (e.g., a block of code/instructions) that references (e.g., with a URL link) a JavaScript file (the "default tag code") on a custom content server. However, one skilled in the art can appreciate that the tag can be replaced with any other type of script, content or code that can implement the functionality of a tag as described herein (e.g., an applet (such as a Java applet), an application (such as a JVM application) or other script (such as a JavaScript) that can be executed, for example, by a visitor's browser or a browser plug-in). The tag is preferably incorporated along with the code/instructions for one or more pages of the web site.

Figure 1:
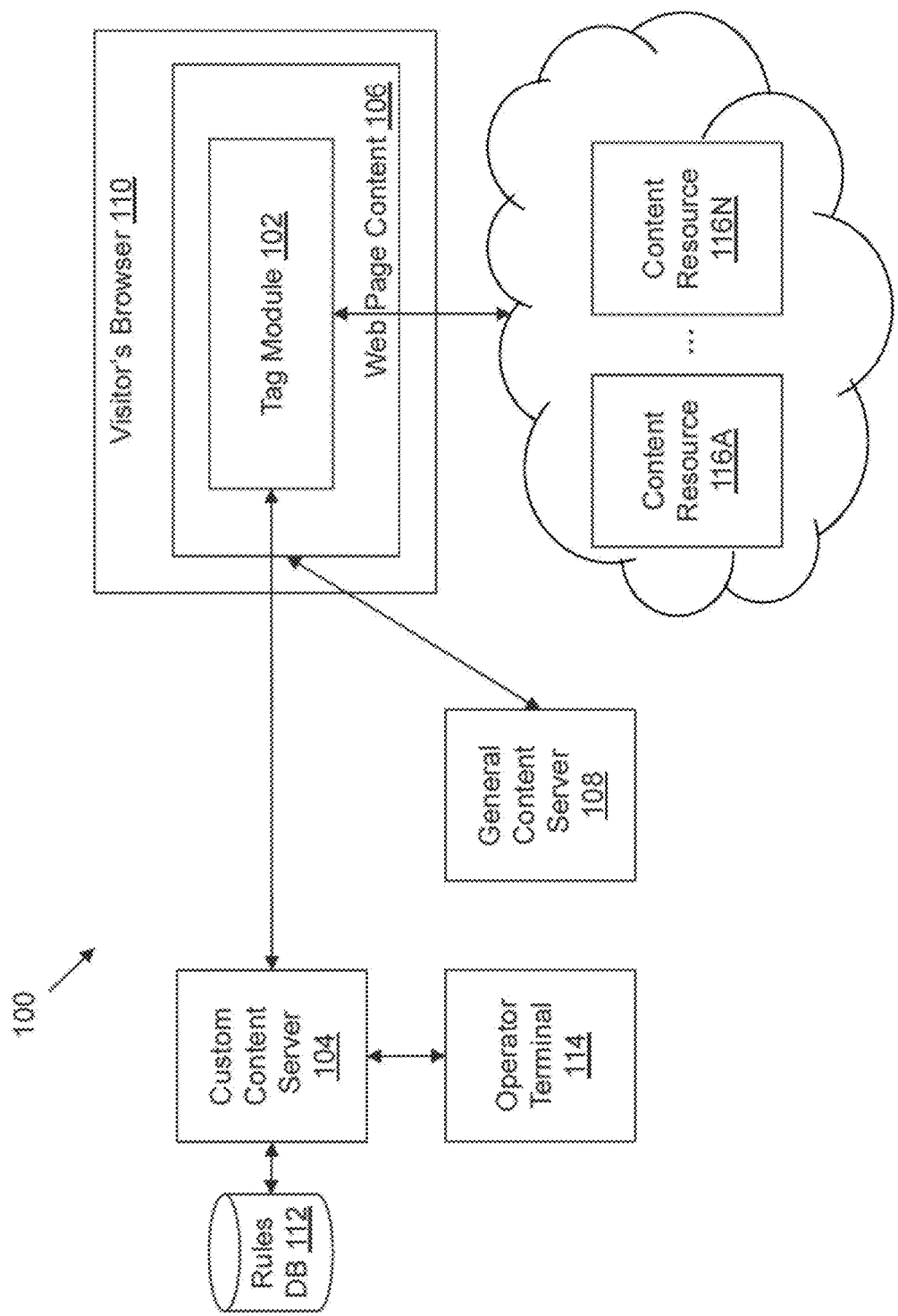
FIG. 1 is a diagram that illustrates a computerized system in which a tag module interacts with a remote custom content server according to one embodiment.

FIG. 1 is a diagram that illustrates a computerized system 100 in which a tag module 102 interacts with a remote custom content server 104 according to one embodiment. A visitor's browser 110, which is executed by a processor, loads web page content 106 from a general content server 108. The web page content 106 includes a tag (e.g., an HTML tag). When the visitor causes the browser 110 to load the web page content 106, the visitor's browser processes the tag which causes the visitor's browser to download default tag code (e.g., a JavaScript code file) from the custom content server 104. The visitor's browser 110 receives, processes and executes the default tag code to generate tag module 102 in memory. Tag module 102, which is executed by a processor, communicates with the custom content server 104.

In the computerized system 100, the default tag code contains code/instructions that monitor and transmit information indicative of the visitor's interactions with the web page (e.g., web page content 106). For example, the visitor's interactions can include mouse clicks, form entries, and the visitor's Uniform Resource Locator (URL) history. Combinations of one or more visitor interactions can trigger actions, which is described below with reference to FIG. 4.

In some embodiments, the custom content server 104 is a computing device with a processor and memory. The custom content server 104 is in communication with rules database 112 through a direct connection or over a network. The custom content server is also in communication with operator terminal 114. The tag module 102 is optionally in communication with content resources 116A-116N (collectively content resources 116). The content resources 116 can be included such that in some embodiments the tag module 102 can download external code stored on a content resource 116 (e.g., if the tag module 102 needs to download and execute code that is pointed to by a reference). FIG. 1 is an exemplary diagram and is not intended to be limiting. For example, while FIG. 1 only shows one custom content server 104, there can be a plurality of custom content servers in communication with tag module 102. Also, for example, while the general content server 108 is shown separately from the content resources 116, the general content server 108 can also function as a content resource 116 (as described below with reference to FIG. 4).

Figure 2:
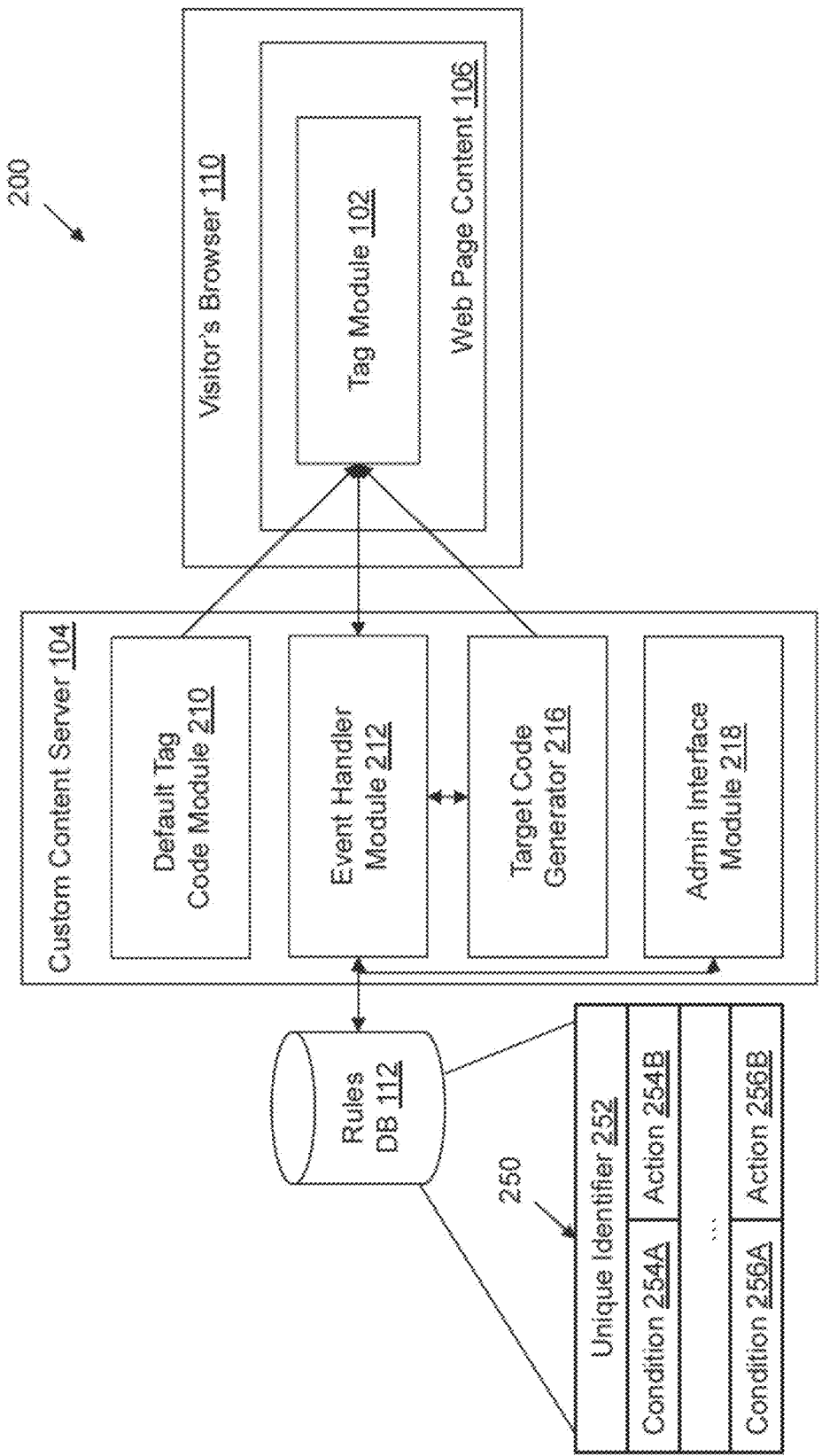
FIG. 2 is diagram that illustrates the tag module interacting with the custom content server of FIG. 1 according to one embodiment.

FIG. 2 is diagram 200 that illustrates the tag module 102 interacting with the custom content server 104 of FIG. 1 according to one embodiment. The tag module 102 comprises the executing default tag code as described above with reference to FIG. 1. As will be described below, based on the monitored behavior of the visitor, the custom content server can transmit custom targeted tag code to the tag module 102, and the tag module, in turn, can process and execute the custom targeted tag code to, for example, customize the web page content 106 for the visitor. The custom targeted tag code can also cause a change in the web page display (e.g., pop-up windows, insertion of additional video or graphical content), the writing of metadata to the visitor's computer (e.g., a cookie), or any other desired action capable of being performed by the visitor's browser 110 or plugins thereto.

The tag module 102 (which is generated when the visitor's browser executes the default tag code in memory) is in communication with the event hander module 212 executing in the custom content server. The event handler module 212 is in communication with the rules database 112 of FIG. 1. The custom content server 104 can further include a target code generator 216, which generates (or obtains) and transmits the custom targeted tag code to the tag module 102 upon the occurrence of a condition defined by rules in the rules database 112. The custom content server 104 includes an administration interface module 218.

The admin interface module 218 provides an administration interface (e.g., one or more graphical user interfaces) through which website operators can define one or more rules that provide custom responses to a visitor's interactions with the web page. The rules database 112 includes one or more tables 250. Table 250 includes a unique identifier 252 that associates the defined rules 254 and 256 with the tag embedded in the web page content 106 (each rule comprising one or more conditions 254A, 256A and actions 254B, 256B, respectively). For example, the tag module 102 can append the unique identifier to the monitored visitor data sent to the custom content server 104 in, for example, a query string. Using this identifier, the event handler module 212 can associate the rules 254 and 256 with the tag module 102.

In particular, a website operator can define a rule in which the action performed (254B, 256B) in response to the occurrence of one or more conditions (254A, 256A) involves the server 104 transmitting specific code or instructions, which are input to the tag module 102 for processing and execution. Such code or instructions is referred to herein as the custom targeted tag code. Alternatively, the action can be the execution of a link or reference (e.g., by the tag module) which results in the desired code or instructions being loaded into the visitor's browser 110 from another resource (e.g., the occurrence of the condition causes the code generator 216 to send custom targeted tag code to the tag module 102, which the tag module 102 executes and determines it needs to download a code file residing on the content resources 116).

Accordingly, when the custom content server 104 detects an event triggered by one of the website visitors, the default tag code (e.g., being executed by the tag module 102) is supplemented by custom content server 104 transmitting the custom targeted tag code (or a link to the custom targeted tag code) specified by the website operator through an administrative interface. Standard programming languages and interfaces, such as JavaScript, can facilitate the addition and execution of the custom targeted tag code to add to the tag module 102.

Figure 3:
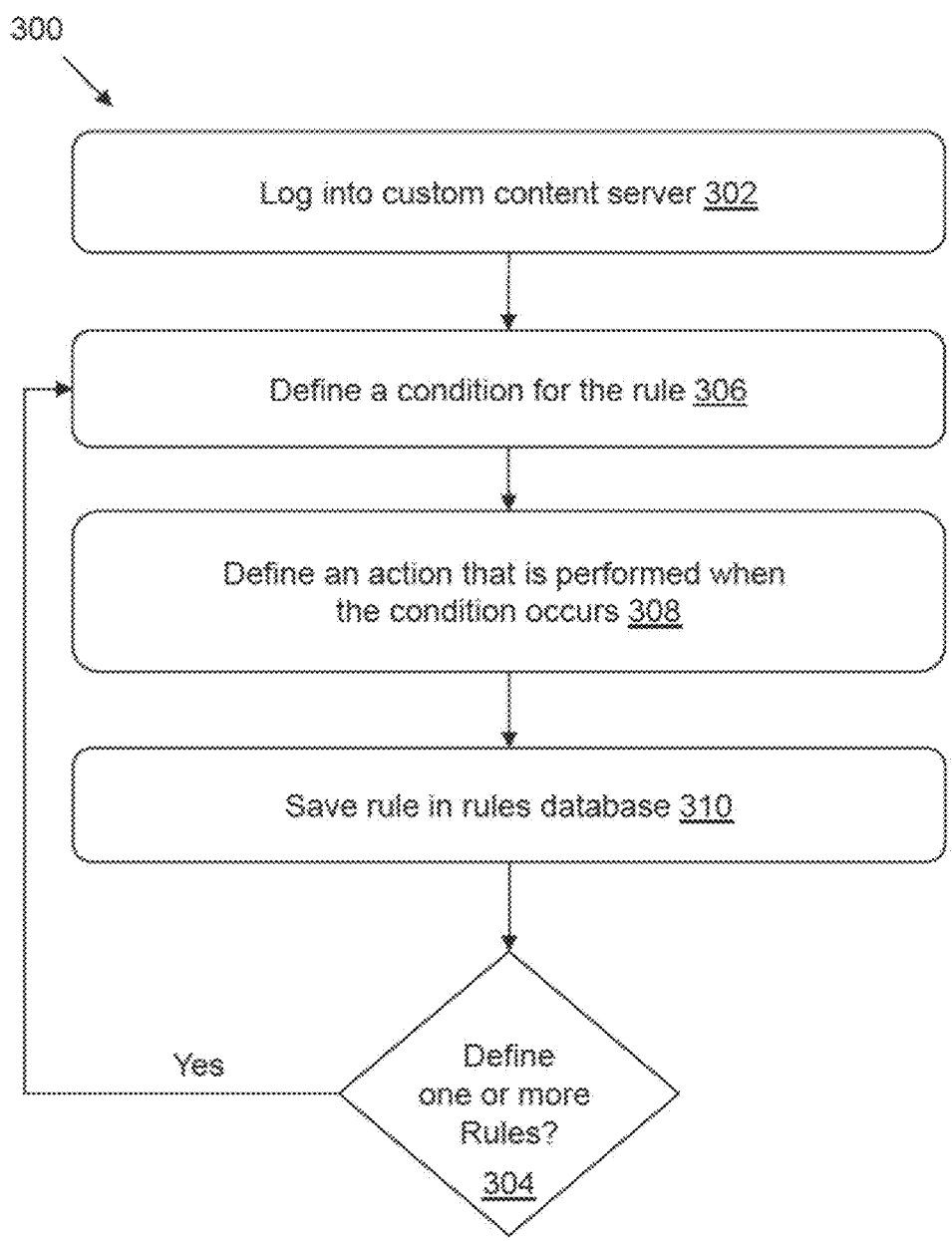
FIG. 3 is a flow diagram that illustrates a method for configuring the rules in the rules database through the administration interface according to one embodiment.

FIG. 3 is a flow diagram that illustrates a method 300 for configuring the rules in the rules database through the administration interface according to one embodiment, which will be described using FIGS. 1 and 2. At step 302, a website administrator (or "admin") (e.g., using the operator terminal 114) logs into the custom content server 104 using the admin interface module 218. At step 306, the admin defines a condition for a rule (e.g., using the exemplary rule configuration web pages of FIGS. 7 and 8). At step 308, the admin defines an action that is performed when the condition defined in step 306 is satisfied. At step 310, the custom content server 104 saves the rule in the rules database 112. At step 304, if the admin is going to set up one or more additional rules the method 300 proceeds to step 306 and steps 306 through 310 are repeated.

Referring to step 302, an admin can be, for example, an admin of the custom content server 104. For example, a customer can set up his or her website to include tags that cause code and/or scripts to be downloaded from the default tag code module 210 of the custom content server 104. The tag module 102 is executed on the visitor's browser 110. The tag module 102 is responsible for communicating from the visitor's browser 110 to the custom content server 104. For example, the tag module 102 can transmit updates (e.g., periodic updates or visitor event-driven updates) to the custom content server 104 that comprise data indicative of the visitor's interaction with the web page content 106 (e.g., how long the visitor has been at a particular web page, the viewing history of the visitor, etc.).

Referring again to step 302, each admin is associated with a unique identifier. The unique identifier is, for example, a user identification number for the admin. The admin logs into the custom content server 104 using their unique identifier. The admin logs into, for example, an administration interface being presented through the admin interface module 218. The administration interface provides admins with the ability to define various configuration parameters for tags that are installed in their web pages (e.g., web page content 106).

In some embodiments, each customer of the system is associated with a unique identifier (e.g., an account identifier). For example, a customer is a user of the custom content server 104. A customer can be any third party (e.g., a company, individual, etc.) that uses tags in one or more of its web pages to provide customized content to visitors of its web pages. One or more admin unique identifiers can be associated with a customer unique identifier. For example, an admin's unique identifier can be associated with a company's account identifier to facilitate creation of rules and other maintenance of tags for the company's web pages. The admin can be an employee of the company and/or a third party hired by the company to maintain the company's web pages. Advantageously, for example, each time the admin logs into the custom content server using their unique identifier, they are also associated with the company (and therefore are granted access to settings for the company).

The customer's unique identifier (e.g., unique identifier 252 of FIG. 2) facilitates communication with tag modules (e.g., tag module 102) that are created when a visitor loads web pages with embedded tags that are associated with the customer. For example, each tag module 102 is associated with a unique identifier (e.g., an identifier for the customer's account, which can be stored on the custom content server 104), and the custom content server 104 (e.g., using the event hander 212) uses the unique identifier associated with the tag to communicate with the tag (e.g., to determine which rules from the rules database 112 the event handler module 212 uses to monitor a visitor's interactions with web page content 106, to determine which custom targeted tag code is uploaded to tag module 102 upon the occurrence of a condition specified by the rules, etc.).

Referring to step 306, the admin can select a condition from a list of predefined conditions. For example, an admin can select an "idle for more than X seconds" condition, and specify the number of seconds. By selecting this condition, the admin knows that if a visitor is idle on the web page content 106 for more than X seconds, then the condition will be satisfied and the custom content server 104 will perform the associated response that is defined in step 308. While the admin can select a condition from a list of predefined conditions, any method can be used to define a condition for a rule. For example, the admin can create the condition from scratch (e.g., using the admin interface module 218), the admin can create a custom list of conditions defined by the admin, and/or can create the conditions through any other method without departing from the spirit of the invention.

Referring to step 308, the admin defines an action (a response) that the custom content server 104 performs upon the occurrence of the condition defined in step 306. A response is, for example, code (e.g., custom targeted tag code) that is transmitted to the tag module 102 and is processed and/or executed in the visitor's browser 110. The responses can be flexible so each admin can tailor the response to their individual needs. For example, an admin may enter code that the admin wants the visitor's browser 110 to execute upon the occurrence of the condition (e.g., via a text box presented in the admin program by the admin interface module 218). Or, for example, the admin can insert a reference that links the tag module 102 to a separate location (e.g., to a location on the general content server 108 or the content resources 116) where the code that the admin wants the visitor's browser 110 to execute is defined. Or, for example, the admin can select an action from a list of predefined actions.

Figure 4:
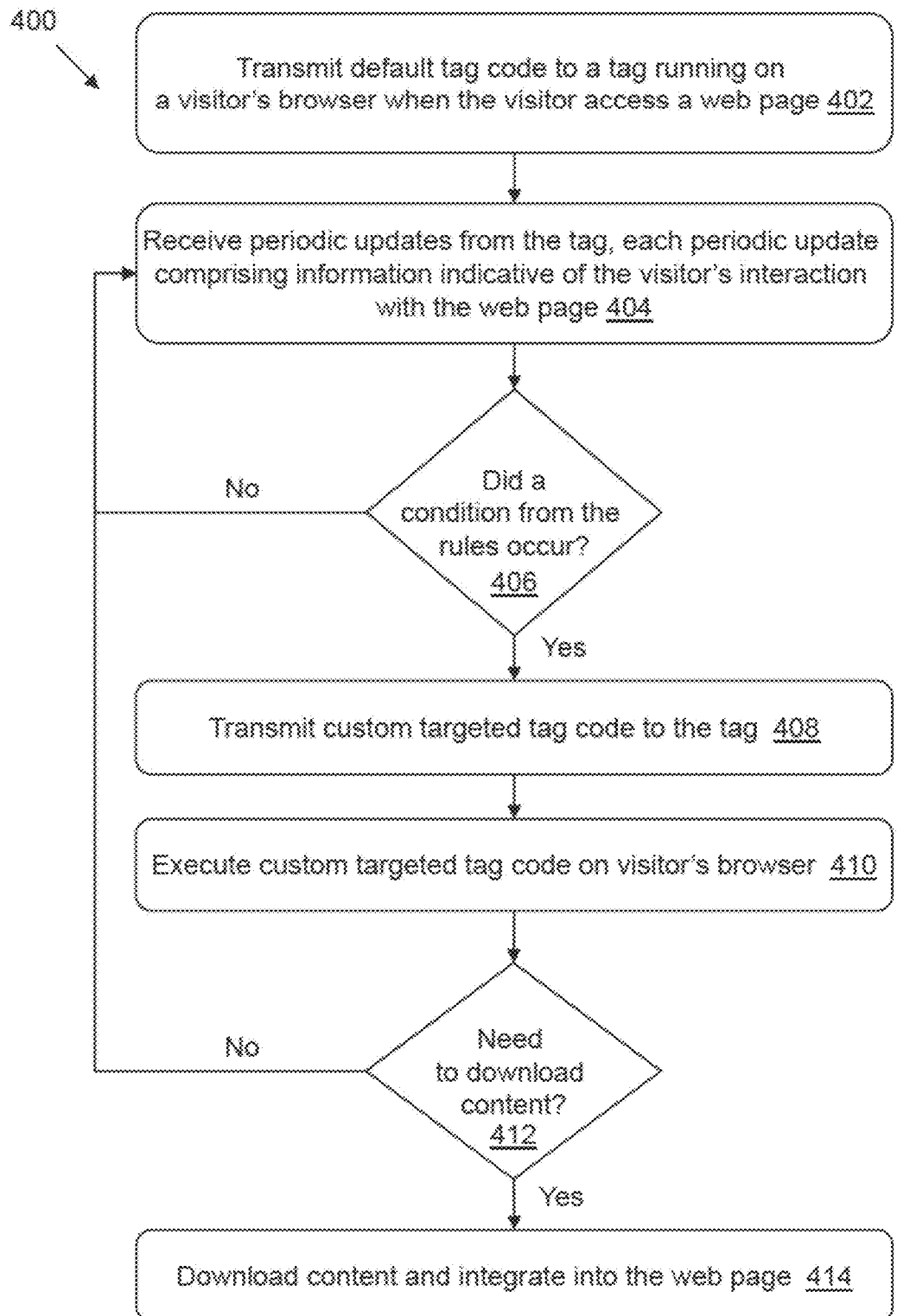
FIG. 4 is a flow diagram that illustrates a method for dynamic customization of a visitor experience on a website using monitored visitor behavior data according to one embodiment.

FIG. 4 is a flow diagram that illustrates a method 400 for dynamic customization of a visitor (website user) experience on a website using monitored visitor behavior data according to one embodiment. In particular, this method provides additional code to a web page without modifying the original code for the web page (e.g., the underlying code retrieved from a content server). Advantageously, for example, customized content can be provided to a visitor without modifying the web page code. The additional code can be additional content and/or any code that is capable of being processed by the visitor's browser or plug-in. At step 402, the custom content server 104 transmits default tag code to the visitor's browser, which generates the tag module 102 from such default code when the visitor loads the web page content 106. At step 404, the custom content server 104, through the event handler module 212, receives periodic updates from the tag module 102, each periodic update comprising information indicative of the visitor's interaction with the web page. At step 406, the custom content server 104, using the event handler module 212, determines whether a condition of the one or more rules stored in the rules database 112 associated with the tag module 102 occurred. The rules analyzed are those in the rules database having an identifier that matches the unique identifier of the tag module 212. If a condition occurred, the method 400 proceeds to step 408, where the custom content server 104 transmits the custom targeted tag code, through the target code generator 216, to the tag module 102. If a condition did not occur, the method 400 proceeds back to step 404. At step 410, the visitor's browser 110 executes the custom targeted tag code resulting in more functionality provided to the tag module 102. At step 412, the tag code determines whether the tag module 102 needs to download additional content for the tag module 102 (e.g., from a remote server, such as the general content server 108 or the content resources 116). If the tag module 102 needs to download additional content, the method 400 proceeds to step 414, at which point the tag module 102 downloads the additional content and integrates the additional content into the web page content 106. If the tag module 102 does not need to download additional content, the method 400 proceeds back to step 404.

Referring to step 408, the custom content server 104 performs the associated action with the satisfied rule. For example, if the action is to transmit a new code to tag module 102, then the target code generator 216 transmits the new code to the tag module 102, which the tag module 102 did not previously contain. Advantageously, a website host can define the rules that provide new code to a web site (e.g., via the tag module 102) that can cause the content of web page content 106 to be modified (and/or additional processing to be performed by the visitor's browser 110) in a way that is customized to the visitor's interactions with the web page content 106. For example, the page can load additional video, additional content (e.g., a coupon), update a banner, and/or perform other actions in response to the visitor's interactions with the web page content 106. Some examples are described with reference to FIGS. 5 and 6 below.

Referring to steps 412-414, the tag module 102 may require additional content (e.g., a video stored on a content resource 116) to complete execution of the custom targeted tag code. The tag module 102 can download the additional content and incorporate the content into the web page content 106 using the custom targeted tag code. For example, as described below with reference to FIG. 7B, the custom targeted tag code can include a uniform resource locator (URL) for a location where video content is stored such that the executing custom targeted tag code can cause the visitor's browser to download and integrate the video content into web page content 106.

Figure 5:
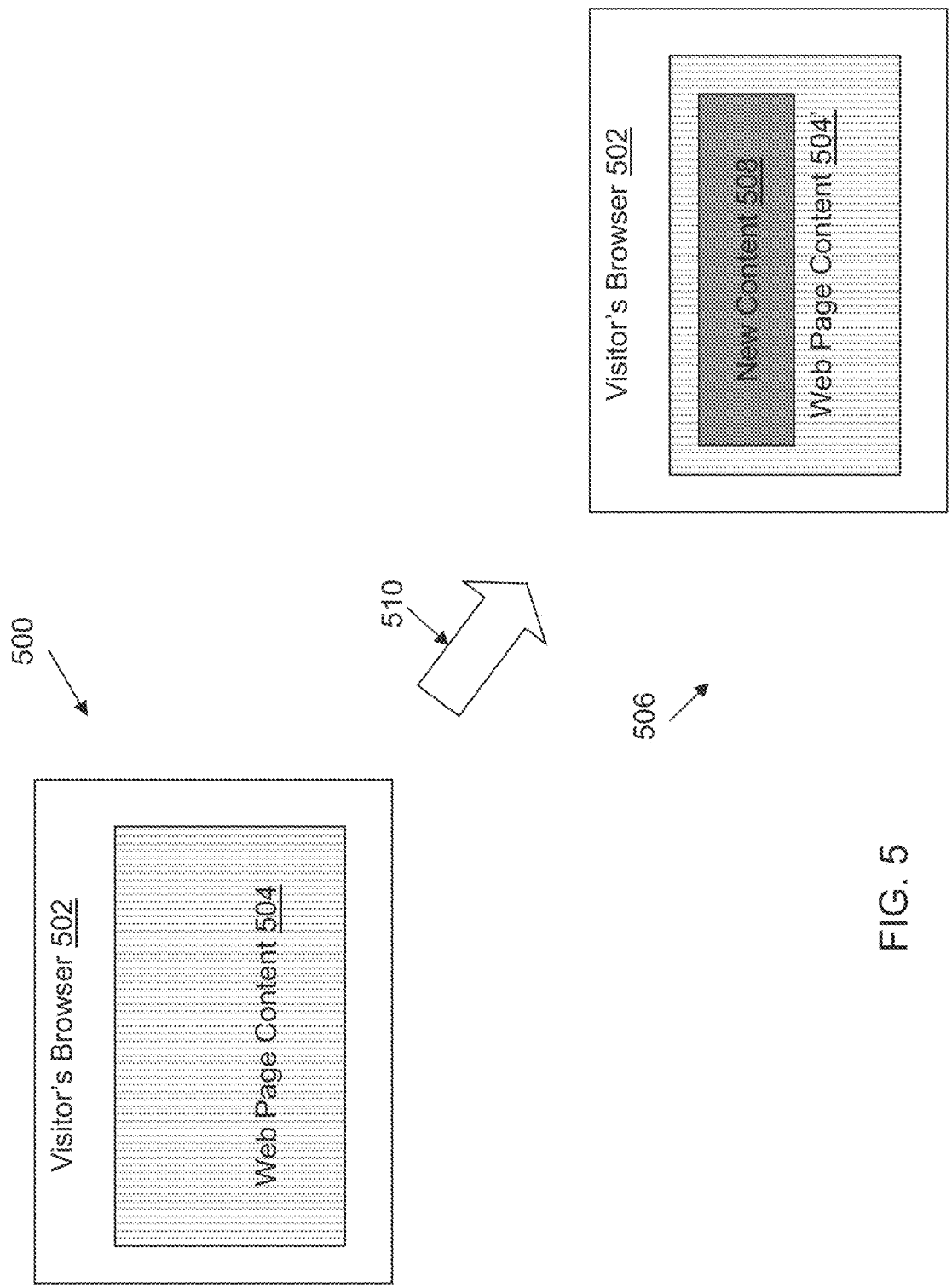
FIG. 5 is an exemplary diagram illustrating an original web page which shows a visitor's browser displaying web page content and new web page which shows the visitor's browser displaying web page content that incorporates in new content according to one embodiment.

Advantageously, a website provider can use tags linking to a custom content server to provide any type of additional content into a web page without editing the original code for the web page content. For example, a website provider can use tags to provide coupons, to display a web banner, to add video content, and/or to incorporate any other kind of content into a web page. FIG. 5 is an exemplary diagram illustrating an original web page 500 which shows a visitor's browser 502 displaying web page content 504 and modified web page 506 which shows the visitor's browser displaying web page content 504' that incorporates in new content 508 according to one embodiment. Original web page 500 occurs when the visitor first navigates to a website that causes the visitor's browser 502 to load web page content 504 (e.g., web page content 504 is loaded from general content server 108). Web page content 504 includes a tag, which causes the visitor's browser 502 to download default tag code (e.g., JavaScript code from the custom content server 104) when the visitor's browser 502 loads web page content 504. The visitor's browser 502 executes the default tag code, thereby generating a tag module (e.g., tag module 102). The tag module monitors the visitor's interaction with the web page.

The custom content server receives updates (e.g., periodic or visitor-driven updates) from the tag module. As shown with arrow 510 and referring to FIG. 2, when the event handler module 212 determines that a condition for one of the rules stored in the rules database 112 is satisfied based on the updates (e.g., step 406-408 of FIG. 4), the tag module downloads from the target code generator 216 the custom targeted tag code (e.g., the target code generator 216 sends the custom targeted tag code in a response message to tag module 102, or tag module 102 requests the custom targeted tag code from the target code generator 216, etc.). The tag module executes the custom targeted tag code in the visitor's browser 502, which causes new content 508 to be displayed (e.g., steps 410-414). The new content 508 is seamlessly integrated into the web page content 504' without the visitor performing any steps.

For example, the website provider of web page content 504 can partner with a video company to incorporate video content into the website provider's web pages without modifying the code (e.g., without modifying the original HyperText Markup Language (HTML) code of the web pages). For example, web page content 504 already includes a tag in the HTML code (e.g., embedded as an HTML tag). The website provider can create rules that cause video content (i.e., the new content 508 for this example) to be incorporated into web page content 504' using the tag (e.g., steps 302-310 of FIG. 3). For example, the website provider can configure a rule to (upon the occurrence of a condition) upload and execute video code to the visitor's browser 502, resulting in the video content being integrated into web page content 504' without the visitor having to navigate away from web page.

Figure 6:
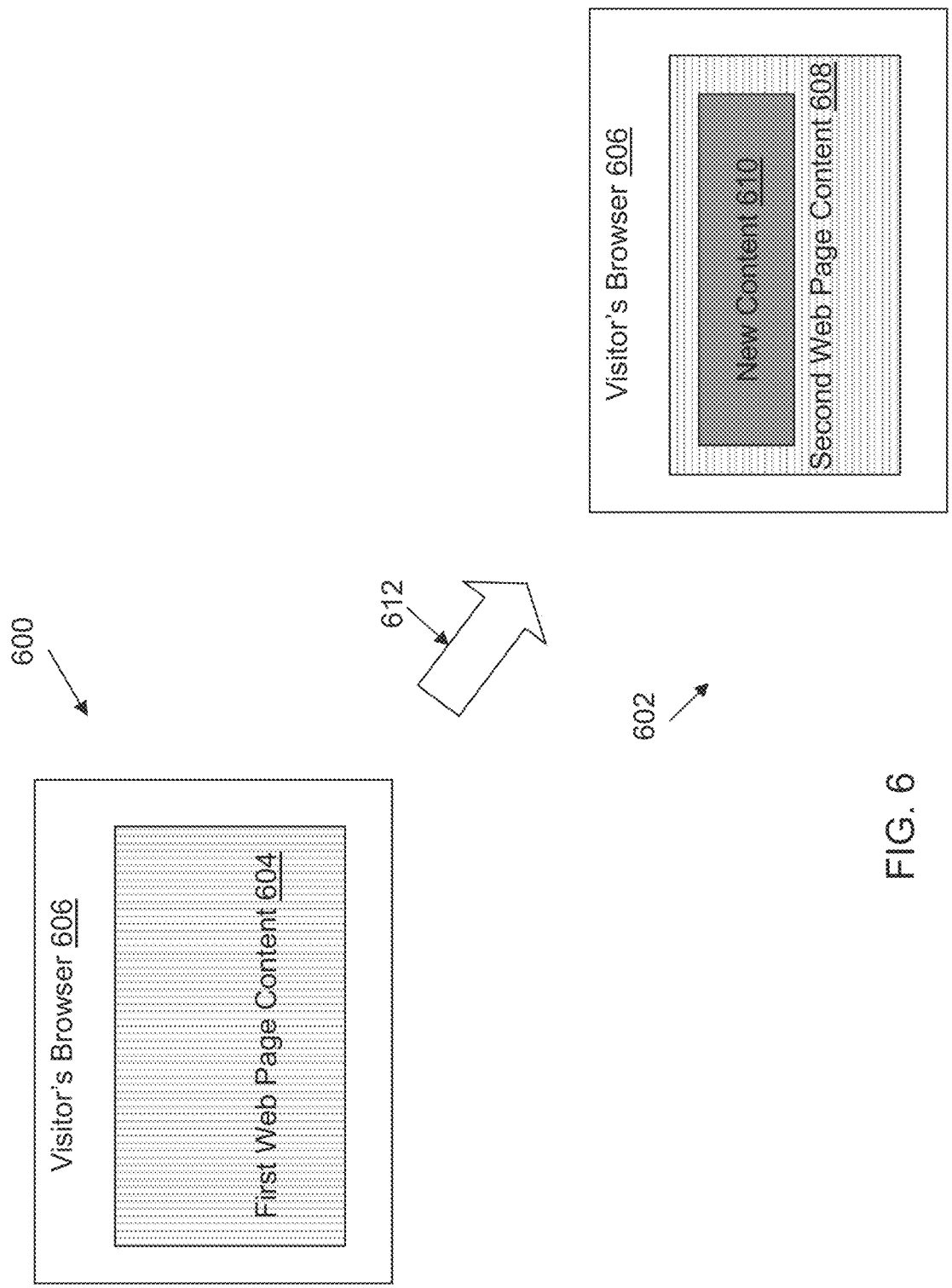
FIG. 6 is an exemplary diagram illustrating new content being integrated into second web page content for a second web page based on a visitor's interactions with a first web page according to one embodiment.

In some examples, tags can be used to add new content to a web page based on a visitor's interaction with both that web page and one or more previous web pages. FIG. 6 is an exemplary diagram illustrating new content 610 being integrated into second web page content 608 for a second web page 602 based on a visitor's interactions with a first web page 600 according to one embodiment. The visitor navigates to the first web page 600 using the visitor's browser 606. The visitor's browser 606 loads the first web page content 604 which includes a tag. The visitor's browser 606 downloads and executes the default tag code, creating a tag module (not shown) which monitors the visitor's interaction with the first web page 600. Using steps 302-310 of FIG. 3, the admin of the first web page 600 can add one or more rules that integrates code created by a third party company (e.g., an advertisement company) into the first web page content 604 to store information indicative of the visitor's interaction with the first web page 600 (e.g., for later use, such as when the visitor navigates to the second web page 602). For example, a rule can be defined that when a visitor visits a particular web page (the condition), then code is transmitted to and executed by the tag module which causes the tag module to store information for the visitor (the action). For example, the tag module can receive and execute custom targeted tag code that causes the visitor's browser 606 to create and store a cookie on the visitor's browser 606 that includes information indicative of the visitor's interaction with the first web page 600 (e.g., which links of the first web page 600 the visitor clicked on, how long the visitor remained on the first web page 600, and/or any other statistics or information pertaining to the visitor and/or their interaction with the first web page 600).

As shown by arrow 612, when the visitor navigates to the second web page 602, the third party company uses stored information about the visitor's interactions with the first web page 600 to incorporate the new content 610 into the second web page content 608. The second web page content 608 can optionally also include a tag. The website provider of the second web page 602 (which can be, and is often, different than the website provider of the first web page 600) can add one or more rules that integrates code created by the third party company into the second web page content 608. The rules can be defined to incorporate new content 610 into the second web page content 608 based on the visitor's interactions with the first web page 600 (e.g., based on a stored cookie).

In some embodiments, the data stored on the visitor's browser 606 (e.g., the cookie) must be of the third party company's domain so the third party company can later access the cookie. For example, if the cookie created by the first web page 600 is created by the website provider for the first web page 600, then the cookie is of the website provider's domain. Permissions can be configured (e.g., security settings for the custom content server 104) such that the third party company cannot access this cookie because it is not of the third party company's domain. The website provider for the first web page 606 can use the third party company's code to create the cookie (e.g., by providing a link to the third party company's code for the action to the rule, which causes the visitor's browser 606 to download and execute the third party company's code). Similarly, the website provider for the second web page 602 can partner with the third party company such that the third party company can access the previously stored cookie since the cookie was created in the third party company's domain (and therefore, the third party company can tailor the new content 610 based on the visitor's interactions with both the first web page 600 and the second web page 602).

For example, assume the visitor navigates to first web page 600 at URL www.site1.com. Later, when the visitor navigates to the second web page 602 at URL www.site2.com, the visitor can be presented with an advertisement that is relevant to the visitor's browsing history at both www.site1.com and www.site2.com. For example, assume www.site1.com is for a particular cell phone carrier, and the tag module being executed by the visitor's browser 606 stored a cookie indicative of the visitor viewing a particular type of cell phone. Assume also for the purposes of this example that www.site2.com is a consumer review website, and the visitor navigates to a review of the same cell phone the visitor was viewing at www.site1.com. The new content 610 is added to the second web page content 608 because the stored cookie indicates the visitor had interest in the cell phone that is the subject of the consumer review at www.site2.com. For example, the visitor can be presented with an advertisement for the cell phone. Advantageously, the new content 610 can be tailored to the visitor's experiences with both the first web page 600 and the second web page 602.

While the examples above described with reference to FIGS. 5-6 include uploading new code to the tags to display new content (e.g., new content 508 and new content 610 in FIGS. 5 and 6, respectively), the custom targeted tag code that is sent to or downloaded by tag module 102 is not limited to only incorporating new content into the existing web page content. For example, as described with reference to the first web page content 604 of FIG. 6, the custom targeted tag code can add logic and/or functionality to the visitor's browser that operates transparently to the visitor (e.g., to store a cookie).

Figure 7A:
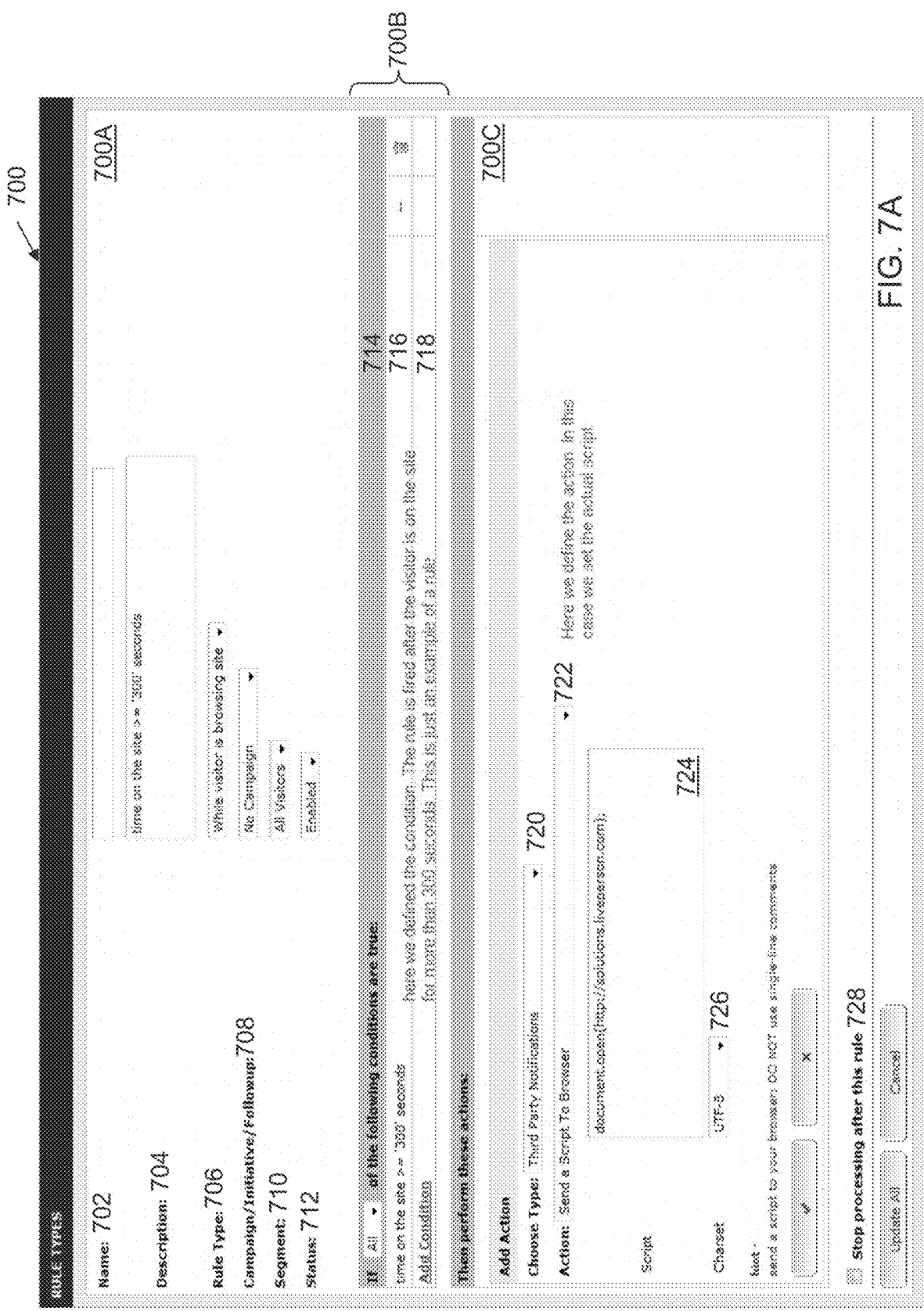

FIGS. 7A-7B are exemplary screenshots showing a rule configuration web page 700 for adding rules according to one embodiment. Referring to FIG. 7A, an admin (e.g., using operator terminal 114) creates one or more rules using the configuration web page 700. The configuration web page 700 includes three sections, the description section 700A, the condition section 700B, and the action section 700C. The description section 700A includes a name field 702 for setting a name for the rule. The description section 700A includes a description field 704 for setting a description of the rule (e.g., "time on this site>='300' seconds"). The description section 700A includes a rule type field 706 that includes a drop-down list for selecting the type of rule (e.g., "While visitor is browsing site" to indicate the rule is executed while the visitor is browsing the website, "When visitor enters page," "When visitor enter site," "When visitor leaves site," "When call is established," "When user clicks to chat," etc.). The description section 700A includes a campaign/initiative/followup field 708 that includes a drop-down list for selecting a campaign for the rule (e.g., "No Campaign" or one or more defined campaigns that are used to gather rules that have a common purpose, such as a marketing campaign). The description section 700A includes a segment field 710 that includes a drop-down list for selecting whether to apply the rule to all visitors or to a segment of visitors (e.g., an admin can select "all visitors" to apply the rule to all visitors to the website). The description section 700A includes a status field 712 that includes a drop-down list for an admin to select whether the rule is enabled (e.g., the admin selects "Enabled" so the event handler module 212 knows to evaluate the conditions for the rules upon receipt of updates from the tag module 102).

The condition section 700B includes field 714 for configuring whether all of the conditions for the rule need to be satisfied before performing the action defined in the action section 700C (e.g., if there are multiple conditions, selecting "All" means each of the conditions must occur before the action defined in action section 700C is performed). The field 716 lists the selected conditions for the rule, where the admin can individually delete one or more of the listed rules. The button 718 allows the admin to add an additional condition to the conditions listed in field 716.

The action section 700C includes a drop-down list for selecting the type of action (e.g., third party notifications, which means that the custom content server 104 notifies entities outside of the custom content server 104 about an event, such as notifying the tag module 102 on a visitor's browser). The action section 700C includes a script area 724 for defining the action (e.g., for the admin to input actual code (custom targeted tag code) to be sent to the tag). While the script area 724 is shown, in some embodiments the configuration web page 700 can include a predefined list (e.g., via a drop-down list) of predetermined response actions that the admin can select. The action section 700C includes a charset field 726 that includes a drop-down list for selecting the character set. The action section 700C includes a checkbox 728 for indicating whether processing stops after the action is performed (e.g., whether the event handler module 212 of FIG. 2 individually evaluates all rules for the tag, or to stop processing the rules once the one rule is satisfied).

FIG. 7B includes similar fields to FIG. 7A but instead of the script field 724, the action section 700C includes a send field 750 that includes a drop-down list for the admin to select what to send to the tag (e.g., the admin can select "script" (custom targeted tag code) which sends a script to the tag or "img" which sends an image to the tag). If a script is sent to the tag, the tag executes the code in the browser. If an image is sent to the tag, the image is loaded to the browser. The action section 700C also includes source field 752 ("src") for the admin to insert the source of the code script to send to the tag (e.g., the admin can input a URL to the code script, such as "www.mysite.com/x.js"). As can be seen in FIGS. 7A and 7B, depending upon the selected value for the action field 722, the contents of the rule configuration webpage 700 can dynamically change so the admin is presented with the appropriate entry fields for the selected action (e.g., in FIG. 7A, when the admin selects "Send a Script To Browser", the action section 700C includes the script field 724, while in FIG. 7B when the admin selects "Send Tag To Browser", the action section 700C includes the send field 750 and the source field 752). The ruel configuration webpage 700 can be implemented with, for example, HTML and javascript. Advantageously, an admin using the rule configuration webpage 700 can directly insert the code the admin wants the tag to run (e.g., in the script field 724), or the admin can point the action to a preprogrammed code file).

While FIGS. 7A and 7B show various embodiments of the rule configuration web page, they are not intended to be limiting. One skilled in the art can appreciate that any number and type of configuration methods (e.g., xml files, pre-loaded configuration scripts, etc.) can be used to define rules for a particular customer's tag (e.g., tags placed in web site(s) associated with the customer).

The above-described computerized methods and apparatuses can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computerized method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices;

magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A computer-implemented method comprising:
    receiving a request for default tag code from a browser, the request being associated with a webpage that is loaded by the browser, wherein the default a tag code when executed by the browser, causes the browser to generate a tag module in memory of the browser, wherein the tag module is associated with one or more rules, and wherein the tag module is a process that executes within the browser and is configured to execute tag code received from one or more remote servers, and wherein the tag module is associated with a unique identifier;
    receiving, via an administrative interface, input enabling at least one rule of the one or more rules, the at least one rule being associated with the unique identifier of the tag module, and wherein the input enabling the at least one rule of the one or more rule is received after the request for the default tag code is received;

repeatedly receiving an update from the tag module, wherein the update includes an indication of one or more user interactions with the webpage and the unique identifier;

determining, from the update, an occurrence of a condition associated with the at least one rule based on the update; and transmitting custom targeted tag code to the tag module in response to determining the occurrence of the condition, wherein the tag module, upon receiving wherein the custom targeted tag code, executes the tag code to provide additional functionality to the browser.

2. The computer-implemented method of claim 1, further comprising:

determining whether the tag module requires additional content; and downloading additional content into the webpage when the tag module requires the additional content.

3. The computer-implemented method of claim 1, wherein a user defines the one or more rules, wherein the one or more rules include rules that determine when to provide new code to the tag module, and wherein the new code is customized according to the update.

4. The computer-implemented method of claim 1, wherein the administrative interface is associated with an administrative unique identifier, and wherein the administrative unique identifier is associated with a plurality of account unique identifiers.

5. The computer-implemented method of claim 4, wherein the administrative unique identifier is an identification number for an administrator that facilitates access to an administration interface.

6. The computer-implemented method of claim 1, wherein the custom targeted tag code is provided to the webpage without modifying original code for the webpage.

7. The computer-implemented method of claim 1, wherein repeatedly receiving the update dynamically enables customizing the webpage.

8. A system, comprising:

one or more data processors; and a non-transitory computer-readable storage medium containing instructions which, when executed on the one or more data processors, cause the one or more data processors to perform operations including:

receiving a request for default tag code from a browser, the request being associated with a webpage that is loaded by the browser, wherein the default a tag code when executed by the browser, causes the browser to generate a tag module in memory of the browser, wherein the tag module is associated with one or more rules, and wherein the tag module is a process that executes within the browser and is configured to execute tag code received from one or more remote servers, and wherein the tag module is associated with a unique identifier;

receiving, via an administrative interface, input enabling at least one rule of the one or more rules, the at least one rule being associated with the unique identifier of the tag module, and wherein the input enabling the at least one rule of the one or more rule is received after the request for the default tag code is received;

repeatedly receiving an update from the tag module, wherein the update includes an indication of one or more user interactions with the webpage and the unique identifier;

determining, from the update, an occurrence of a condition associated with the at least one rule based on the update; and transmitting custom targeted tag code to the tag module in response to determining the occurrence of the condition, wherein the tag module, upon receiving wherein the custom targeted tag code, executes the tag code to provide additional functionality to the browser.

9. The system of claim 8, further comprising:

determining whether the tag module requires additional content; and downloading additional content into the webpage when the tag module requires the additional content.

10. The system of claim 8, wherein a user defines the one or more rules, wherein the one or more rules include rules that determine when to provide new code to the tag module, and wherein the new code is customized according to the update.

11. The system of claim 8, wherein the administrative interface is associated with an administrative unique identifier, and wherein the administrative unique identifier is associated with a plurality of account unique identifiers.

12. The system of claim 11, wherein the administrative unique identifier is an identification number for an administrator that facilitates access to an administration interface.

13. The system of claim 8, wherein the custom targeted tag code is provided to the webpage without modifying original code for the webpage.

14. The system of claim 8, wherein repeatedly receiving the update dynamically enables customizing the webpage.

15. A computer-program product tangibly embodied in a non-transitory machine-readable storage medium, including instructions configured to cause a data processing apparatus to perform operations comprising:

receiving a request for default tag code from a browser, the request being associated with a webpage that is loaded by the browser, wherein the default a tag code when executed by the browser, causes the browser to generate a tag module in memory of the browser, wherein the tag module is associated with one or more rules, and wherein the tag module is a process that executes within the browser and is configured to execute tag code received from one or more remote servers, and wherein the tag module is associated with a unique identifier;

receiving, via an administrative interface, input enabling at least one rule of the one or more rules, the at least one rule being associated with the unique identifier of the tag module, and wherein the input enabling the at least one rule of the one or more rule is received after the request for the default tag code is received;

repeatedly receiving an update from the tag module, wherein the update includes an indication of one or more user interactions with the webpage and the unique identifier;

determining, from the update, an occurrence of a condition associated with the at least one rule based on the update; and transmitting custom targeted tag code to the tag module in response to determining the occurrence of the condition, wherein the tag module, upon receiving wherein the custom targeted tag code, executes the tag code to provide additional functionality to the browser.

16. The computer-program product of claim 15, wherein the operations further comprise:

determining whether the tag module requires additional content; and downloading additional content into the webpage when the tag module requires the additional content.

17. The computer-program product of claim 15, wherein a user defines the one or more rules, wherein the one or more rules include rules that determine when to provide new code to the tag module, and wherein the new code is customized according to the update.

18. The computer-program product of claim 15, wherein the administrative interface is associated with an administrative unique identifier, and wherein the administrative unique identifier is associated with a plurality of account unique identifiers.

19. The computer-program product of claim 18, wherein the administrative unique identifier is an identification number for an administrator that facilitates access to an administration interface.

20. The computer-program product of claim 15, wherein the custom targeted tag code is provided to the webpage without modifying original code for the webpage.

21. The computer-program product of claim 15, wherein repeatedly receiving the update dynamically enables customizing the webpage.

* * * * *